US007026810B2

(12) United States Patent
Kikugawa et al.

(10) Patent No.: US 7,026,810 B2
(45) Date of Patent: Apr. 11, 2006

(54) METHOD FOR TESTING OR RECORDING SERVO SIGNAL ON PERPENDICULAR MAGNETIC RECORDING MEDIA

(75) Inventors: Atsushi Kikugawa, Higashimurayama (JP); Kiwamu Tanahashi, Kokubunji (JP); Yukio Honda, Fuchu (JP); Masaaki Futamoto, Shiroyama (JP); Yoshiyuki Hirayama, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/054,383

(22) Filed: Feb. 10, 2005

(65) Prior Publication Data

US 2005/0204285 A1 Sep. 15, 2005

Related U.S. Application Data

(62) Division of application No. 10/082,159, filed on Feb. 26, 2002, now Pat. No. 6,894,488.

(30) Foreign Application Priority Data

Sep. 19, 2001 (JP) ............................. 2001-285676

(51) Int. Cl.
*G01B 7/00* (2006.01)
(52) U.S. Cl. ...................................... 324/210; 324/212
(58) Field of Classification Search ................ None
See application file for complete search history.

(56) References Cited

U.S. PATENT DOCUMENTS 5,287,228 A 2/1994 Sawaguchi et al. ........... 360/57
6,888,700 B1 * 5/2005 Litvinov et al. ............ 360/125

FOREIGN PATENT DOCUMENTS

JP 10241108 9/1998
JP 2001 155322 6/2001
JP 2001 209933 8/2001

OTHER PUBLICATIONS

"High SN ratio and signal-stability in trible layer perpendicular media", Nishihara, Journal of the Magnetics Society of Japan, vol. 21, No. S1, pp. 104-108 (1997).
"Observation of Underlayer Domain Noise in Perpendicular Recording Disks", Darragh, IEEE Transactions on Magnetics vol. 29, No. 6, pp. 3742-3744 (1993).
English Translation of Magrow Hill, Communication Modes, pp. 125-126.
A. Kikukawa, et al "Noise Characteristics of Double-layered Perpendicular Media Using Fe-Ta-C Underlayer", IEEE Transactions on Magnetics, vol. 37, No. 4, Jul. 2001, pp. 1602-1604.
A. Kikukawa et al, "Distributions and Characteristics of Spike Noise" 5th PMRC Digest PMRC 2000, pp. 35-36.
Y. Uesaka, "Noise from Underlayer of perpendicular Magnetic Recording Medium" J. Appl. Phys., vol. 5, No. 1, Apr. 1985, pp. 3925-3927.
H. Yamasaki, "Noise Technology in Electronic Circuits", p41 (3.3.4-Synchronized Addition), 1986.

* cited by examiner

*Primary Examiner*—Bot LeDynh
(74) *Attorney, Agent, or Firm*—Mattingly, Stanger, Malur & Brundidge, P.C.

(57) ABSTRACT

An object is to automatically detect the positions of spike noise, create a distribution diagram, and perform pass/fail decisions. The cross-correlation function of the signal waveform from a magnetic head 1 and a reference waveform simulating spike noise is used in extraction of spike noise. The number of peaks in the cross-correlation function exceeding a threshold value is counted, and quantitative evaluation of spike noise is performed.

6 Claims, 29 Drawing Sheets

1···HEAD, 2···HEAD AMPLIFIER, 3···DIGITAL STORAGE OSCILLOSCOPE,
4···SPINDLE MOTOR, 5···HEAD STAGE, 6···SPINSTAND CONTROLLER,
7···COMPUTER, 8···DOUBLE LAYERED PEPENDICULAR MEDIA
9···DESCRIMINATOR

1···HEAD, 2···HEAD AMPLIFIER, 3···DIGITAL STORAGE OSCILLOSCOPE,
4···SPINDLE MOTOR, 5···HEAD STAGE, 6···SPINSTAND CONTROLLER,
7···COMPUTER, 8···DOUBLE LAYERED PEPENDICULAR MEDIA

101···GLASS SUBSTRATE, 102···SOFT MAGNETIC LAYER,
103···NONMAGNETIC INTERMEDIATE LAYER,
104···RECORDING LAYER, 105···PROTECTION LAYER

1···HEAD, 2···HEAD AMPLIFIER, 3···DIGITAL STORAGE OSCILLOSCOPE,
4···SPINDLE MOTOR, 5···HEAD STAGE, 6···SPINSTAND CONTROLLER,
7···COMPUTER, 8···DOUBLE LAYERED PEPENDICULAR MEDIA
9···DESCRIMINATOR

11···AMPLIFIER, 12···HIGH-PASS FILTER, 13···ENVELOPE DETECTOR

71···CARRIER RETRIEVER CIRCUIT, 72···MIXER,
73···LOW-PASS FILTER

201···CLOCK HEAD, 202···DOUBLE LAYERED PERPENDICULAR MEDIA,
203···MAGNETIC HEAD, 204···SPINDLE, 205···ROTARY ENCODER
206···ROTARY ACTUATER, 207···READ/WRITE AMPLIFIER,
208···CONTROLLER

METHOD FOR TESTING OR RECORDING SERVO SIGNAL ON PERPENDICULAR MAGNETIC RECORDING MEDIA

The present application is a divisional application of application Ser. No. 10/082,159, filed Feb. 26, 2002 now U.S. Pat. No. 6,894,488, the contents of which are incorporated herein by reference.

BACKGROUND OF THE INVENTION

1. Field of the Invention

This invention relates to a method for testing perpendicular magnetic recording media, and a method for recording servo signals on perpendicular magnetic recording media.

2. Description of the Related Art

In perpendicular magnetic recording, there exist a mode which uses single-layer perpendicular magnetic recording media, and a mode which uses double-layer perpendicular magnetic recording media. In the latter case, there is the problem of spike noise peculiar to double-layer perpendicular magnetic recording media. Perpendicular magnetic recording media have, below the recording layer comprising a perpendicular magnetization film having a high coercive force to retain information, a soft magnetic the recording head during recording. In general, when there exists a soft magnetic film of size equal to that of the magnetic recording media, a plurality of magnetic domains are formed so as to reduce the magnetostatic energy. This is readily understood by practitioners of the art. When such magnetic domains exist, a strong magnetic field emanates from the neighborhood of the magnetic domain walls of these magnetic domains, so that each time a playback head passes over such areas, a spike-shape output is observed. This is what is generally called spike noise. When information or control information used by the magnetic disk device is written at a position where spike noise exists, the waveform of the playback signal is disturbed. When such disturbances occur, the playback of information, or correct operation of the magnetic disk device, is impeded. Spike noise is described for example in the *Journal of Applied Physics*, Vol. 57, No. 1, pp. 3925–3927 (1985). A description of amplitude modulation of playback signals due to spike noise is given for example in the conference digest of The Fifth Perpendicular Magnetic Recording Conference (PMRC), PMRC 2000, on pages 35 and 36.

Spike noise can be suppressed by, for example, using the technique described in the *Journal of the Magnetics Society of Japan*, Vol. 21, No. S1, pp. 104–108 (1997). However, even in the case of media in which spike noise is suppressed, prior to use in a product it is necessary that the presence of spike noise be checked, and that, should spike noise exist, the state of distribution thereof be understood. Also, it is of course necessary to understand the distribution of spike noise when developing double-layer perpendicular magnetic recording media.

One of the simplest methods for observing the state of spike noise in double-layer perpendicular magnetic recording media is a method using a spin-stand and oscilloscope. A spin-stand is a device used in magnetic recording experiments, comprising a spindle motor for rotating magnetic recording media, a mechanism to cause a magnetic head to seek a prescribed radial position on the media, an amplifier to operate the head and amplify the output signal thereof, and an amplifier for use in recording. Broadly defined, a spin-stand may further comprise a measurement instruments necessary to perform the magnetic recording experiments, such as to evaluate the basic properties of recording media, as well as a computer to control them. In such cases, the equipment is often called a read/write tester.

When an oscilloscope is used to observe head output, if there exist magnetic domains in the soft magnetic layer of the media, spike noise will of course be observed. The spindle motor normally outputs an index signal (rotation origin signal), and if this is used as a trigger for the oscilloscope, it is possible to determine, for a given radius, the angular position from the rotation origin at which the spike noise appears. Either an analog or a digital storage type oscilloscope may be used. Although this method is suitable for obtaining information relating to the spike noise at a given radial position, it is not suitable for grasping the state of spike noise over the entire media surface. This problem can be resolved by using a digital storage oscilloscope and a computer. As one example, a procedure is described in the *IEEE Transactions on Magnetics*, Vol. 29, No. 6, pp. 3742–3744 (1993). That is, while varying the radial position at which observations are made, a digital storage oscilloscope is used at each radial position to detect the head output, which is sent to a computer; the amplitude information is converted into a brightness modulation signal, effecting two-dimensional visualization. By using this method, the state of spike noise can easily be grasped intuitively.

The above-described prior art enables either observation of spike noise positions at a given radial position, or two-dimensional visualization of spike noise. These results are qualitative, and so can be used in qualitative evaluations in the research stage; but they cannot be used for pass/fail decisions in production processes. In research and development also, automatic data processing was not possible. Among the above conventional technologies, the latter example has the problem that, due to the large quantity of data obtained, if the results are to be stored without further processing, a large amount of the recording capacity of a storage device would be consumed. Also, if spike noise traverses servo signals, a prominent external disturbance is added to the servo signal read by the head, giving rise to the problem of greatly reduced tracking precision.

On the other hand, while the above-described prior art enabled evaluation of the distribution, amplitude, waveform, and similar of spike noise, when a signal was actually recorded at the position of spike noise, it was not possible to evaluate the effect on the playback signal. Ultimately, the problem for practical purposes might be that signals cannot be recorded correctly, or that recorded signals cannot be played back correctly. In actuality, it has been found that there are at least two types of influence of spike noise on playback signals: baseline shifts, and amplitude modulation. The effects of each of these on the performance of a magnetic recording device differ.

SUMMARY OF THE INVENTION

The present invention was devised in light of these problems, and has as an object the provision of a method for the quantitative evaluation of spike noise. This invention has as a further object the automatic detection over a broad range of the media of the effects on playback signals of spike noise, discrimination of the types of such effects, and quantitative evaluation of the magnitude of these effects. This invention also has as an object the provision of a method for recording servo signals such that traversal by spike noise is minimized.

In the soft magnetic layer of the perpendicular magnetic recording media, there may exist magnetization states which are not observed as spike noise, but which may disturb the shape of the envelope of the playback signal. This is distinguished from spike noise, but has a similar effect on playback signals; below, for convenience, such magnetization states are also referred to simply as spike noise.

In order to attain the above objects, the perpendicular magnetic recording media testing method adopted in this invention is characterized in having a step in which the output signal waveform from a magnetic head loaded at a prescribed radial position of perpendicular magnetic recording media, rotating at a prescribed velocity, is captured and stored; a step in which the cross-correlation function between the stored output signal waveform and a reference waveform simulating spike noise is calculated; and a step in which the number of peaks in the cross-correlation function exceeding a preset threshold value is counted.

The perpendicular magnetic recording media testing method of this invention is characterized in comprising a step in which the operation, in which the output signal waveform from a magnetic head loaded at a prescribed radial position of perpendicular magnetic recording media rotating at a prescribed velocity is captured and stored, is repeated a plurality of times while changing the loaded radial position; a step in which, at each radial position, the cross-correlation function between the stored output signal waveform and the reference waveform simulating spike noise is calculated; a step in which the coordinates on the media of peak positions at which the cross-correlation function exceeded the preset threshold value are stored; and, a step in which a decision is made as to whether the coordinates of peak positions exist continuously for a preset length or longer on the media.

As the reference waveform simulating spike noise, a waveform having a single positive or negative peak, or a waveform having one or more positive and negative peaks each, can be used. Also, the perpendicular magnetic recording media can be rotated at a fixed angular velocity, and a reference waveform which peak width adjusted according to the radial position of the magnetic head can be used as the reference waveform.

Another perpendicular magnetic recording media testing method of this invention is characterized in comprising a step in which a magnetic head is loaded at a prescribed radial position of perpendicular magnetic recording media comprising a soft magnetic underlayer, and signals are recorded at a prescribed frequency; a step in which recorded signals are played back; and a step in which the type of effect on the playback signal of spike noise appearing in the playback signal is discriminated by means of the envelope shape of the playback signal.

By means of the playback signal envelope shape, the amplitude modulation component contained in the playback signal waveform which is equivalent to spike noise, or the baseline shift in the playback signal, can be discriminated. Amplitude modulation can be discriminated using a high-pass filter and envelope detector, or using a homodyne detector.

This perpendicular magnetic recording media testing method can comprise a step in which the amplitude modulation component is determined from the envelope shape of the playback signal, a step in which the amplitude modulation component is eliminated from the playback signal, and a step in which the baseline shift is determined from the playback signal with the amplitude modulation component removed.

In calculating the actual cross-correlation function, because both the reference waveform and the observed waveform are given by a discrete system, the correlation function is also a correlation function of a discrete system. Because the length is finite for both reference waveforms and observed waveforms, if the respective lengths are 2M and N, then the reference waveform and observed waveform are given by the following respective sequences. Here M and N are both integers.

Reference waveform: $\{u_i\}$ (i: integer, $-M \leq i \leq M-1$)
Observed waveform: $\{x_j\}$ (j: integer, $0 \leq j \leq N-1$)

In what follows, for convenience, both $u_i$ and $x_j$ are assumed to be zero-valued when there is a reference outside the above defined ranges. Also, it is assumed that N>>2M.

Here, a cross-correlation function sequence $\{y_j\}$ normalized using the reference waveform is used. This sequence is defined by the following equation.

$$y_j = \frac{1}{U} \sum_{k=-M}^{M-1} x_{j+k} u_k \quad (j: \text{integer}, 0 \leq j \leq N-1) \tag{1}$$

Here U is the maximum value of the autocorrelation function sequence for the reference waveform, and is given by the following equation.

$$U = \max\left(\left\{\sum_{k=-M}^{M-1} u_k u_{j+k}\right\}\right) \tag{2}$$

Here the function $\max(\{z_i\})$ is a function which determines the maximum value of the sequence $\{z_i\}$. Through this normalization, in order that $U \leq 1$ in nearly all cases, the threshold value should also be considered in the range from 0 or above to less than 1, so that it becomes easier to determine the threshold value.

By using the correlation function with the reference waveform, it becomes possible to reliably detect even spike noise with smaller amplitude than the spike noise detected by direct peak detection from raw observed waveforms. The advantages of using the correlation function are explained using FIGS. 2A and 2B. FIG. 2A shows raw data, and FIG. 2B shows the cross-correlation function. In FIG. 2A, the line appears thick due to the influence of medium noise and other noise. Clearly, in FIG. 2B the effect of noise is greatly suppressed. In FIG. 2A, when the threshold value is set to 0.1 or lower in order to detect small-amplitude spike noise, and peak detection is performed, numerous noise peaks are erroneously discriminated as spike noise. Conversely, it would appear that the threshold value must be set to at least 0.1 or higher in order to prevent erroneous discrimination; but in this case, small-amplitude spike noise is overlooked. In FIG. 2B, even if the threshold value is set as small as approximately 0.05, nearly all small-amplitude spike noise can be detected, without erroneous discrimination of noise. Here, as the reference waveform, a dipulse waveform like that of the following equation (3) was used.

$$y_i = e^{-\left(\frac{i+50}{20}\right)^2} - e^{-\left(\frac{i-50}{20}\right)^2} \quad (j = -100, -99, -98 \ldots, 97, 98, 99) \tag{3}$$

Also, media noise is eliminated, so that erroneous detection due to small ripples is prevented. FIGS. 3A and 3B show an enlarged display of spike noise and its cross-correlation function. FIG. 3A shows the raw data, and FIG. 3B shows the cross-correlation function. The raw data has a place, slightly to the right of the maximum point, at which the peak seems to be split by noise. Here also, in simple peak detection there is a large possibility of erroneous discrimination of the existence of another peak. On the other hand, in FIG. 3B noise is suppressed, and so there is no such concern.

There is considerable freedom in determining the threshold value. The method for determining the most suitable threshold value will differ with the objective of evaluation. If the objective is to detect even small-amplitude spike noise, of course the threshold value should be set as low as possible. However, if set too low, the probability that noise will be erroneously discriminated as spike noise is increased. If, at a given media diameter, the number of peak detections is determined while reducing the threshold value, it is found that the number of detections increases sharply when erroneous discriminations due to noise begin to occur, as shown in FIG. 4; the threshold value should be set at as small a value which is still larger than the value at which this increase occurs. This method can be used to automatically determine the most suitable threshold value. For example, when the number of peak detections simply exceeds a certain value, or when the rate of change of the number of detections exceeds a certain value, it is concluded that erroneous discrimination is occurring.

Because differences may occur in the results obtained using different reference waveforms, the reference waveform must be determined with consideration paid to the soft magnetic layer material, film thickness and layer structure of the media being tested, and to the electrical characteristics of the head and playback system. The simplest reference waveform, with the broadest range of application, is a single-pulse waveform having a single peak; one example is indicated by the following equation (4).

$$y_i = e^{-\left(\frac{i}{20}\right)^2} (i = -50, -49, -48, -47 \ldots, 47, 48, 49) \quad (4)$$

In actuality, the curve shape is not so important, and similar results are obtained if a Gaussian waveform, a Lorentzian waveform, or similar is used. But in the case of the single-pulse waveform, the width of the reference waveform is an important parameter. Of course the closer the width of the reference waveform is to the width of a peak in the observed waveform, the larger is the correlation function value. Hence when using a single-pulse waveform, by selecting a waveform such that the width of the reference waveform is as close as possible to the peak waveforms of actual spike noise, appropriate detection can be performed.

Often the spike noise actually observed is like that shown in FIG. 5, although there are differences depending on the soft magnetic layer material and the layer structure of the media. Hence by using a dipulse-type waveform as the reference waveform, having one positive-direction and one negative-direction peak each as shown in FIG. 6, the noise suppression effect is larger, and more effective detection is possible. The waveform indicated in the above equation (3) is one special example falling within this category. This waveform is characterized by the following four parameters: half-maximum width a of the peak 1, half-maximum width b of the peak 2, distance d between peaks 1 and 2, and amplitude ratio e/f of peaks 1 and 2. However, amplitudes are normalized with e or f, whichever is larger, set equal to 1.

It is also possible to optimize the shape parameters of the reference waveform with respect to the spike noise waveforms in the media to be tested. For a single-pulse waveform, this is performed by determining the half-maximum width of the reference waveform such that the peak value of the cross-correlation function between the single-pulse waveform and an actually captured spike noise waveform is maximized. For a dipulse waveform, half-maximum widths are determined for both the peaks 1 and 2 by the same method as that for single-pulse waveforms. In this case, e/f is determined from the peak values of the respective correlation functions. Finally, the value of d which maximizes the peak value of the correlation function between the dipulse waveform and the spike noise waveform is determined.

DESCRIPTION OF THE PREFERRED EMBODIMENTS

Figure 1:
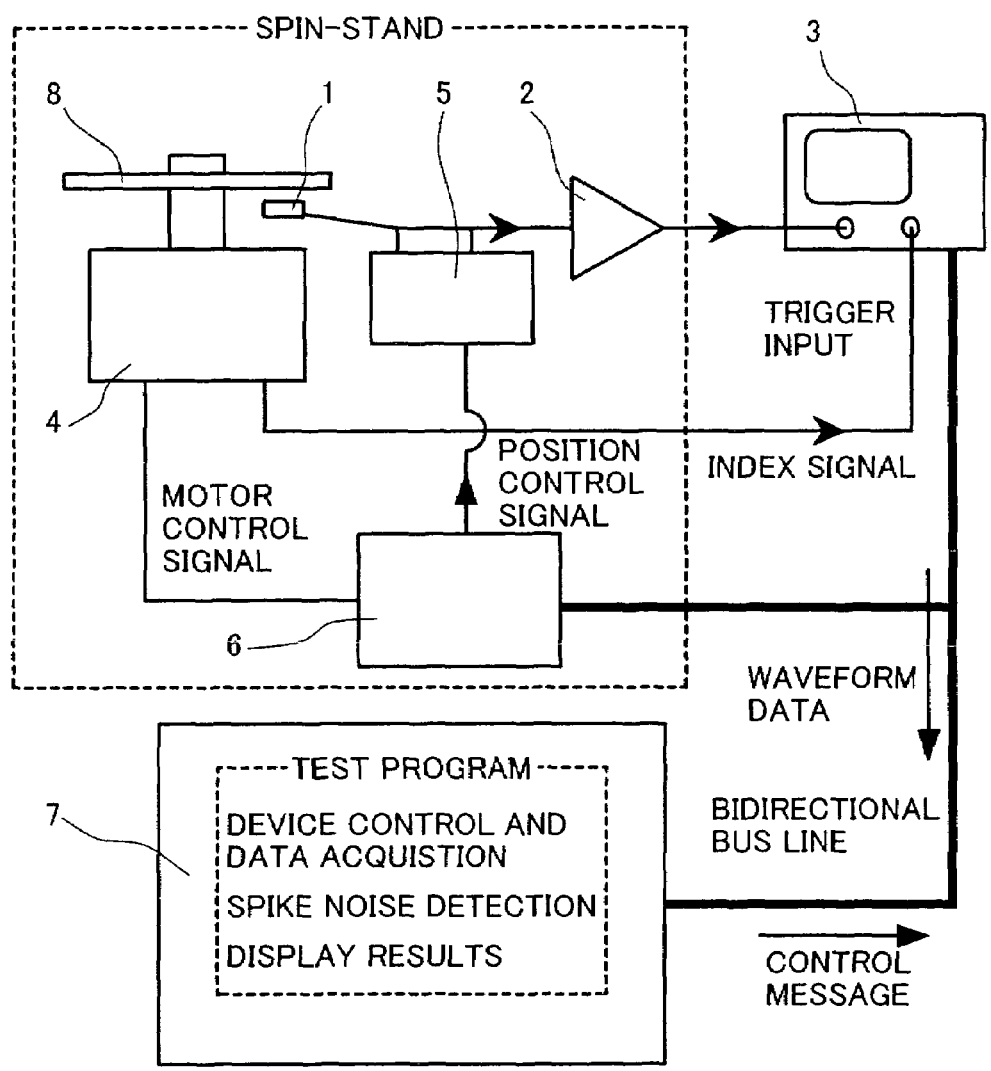
FIG. 1 is a summary drawing showing one example of perpendicular magnetic recording media testing equipment of this invention.
Figure 2A:
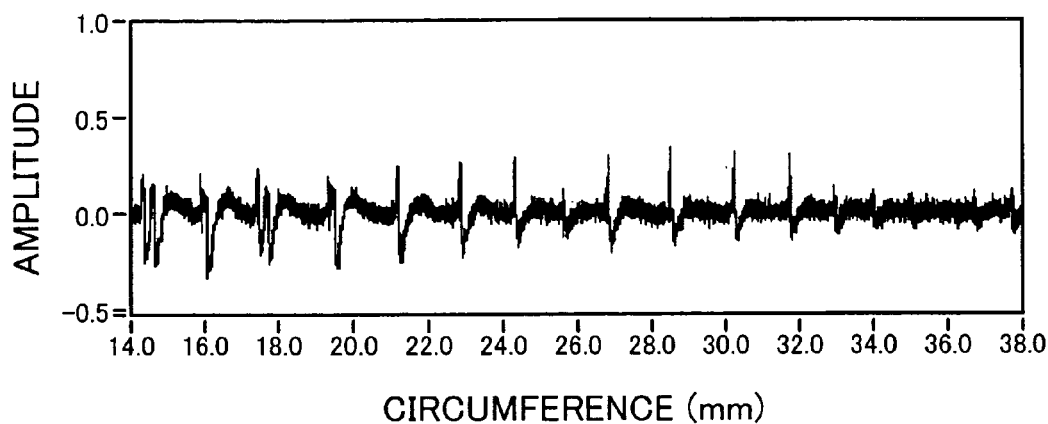
FIGS. 2A and 2B are drawings which explain the advantages of using a correlation function.
Figure 2B:
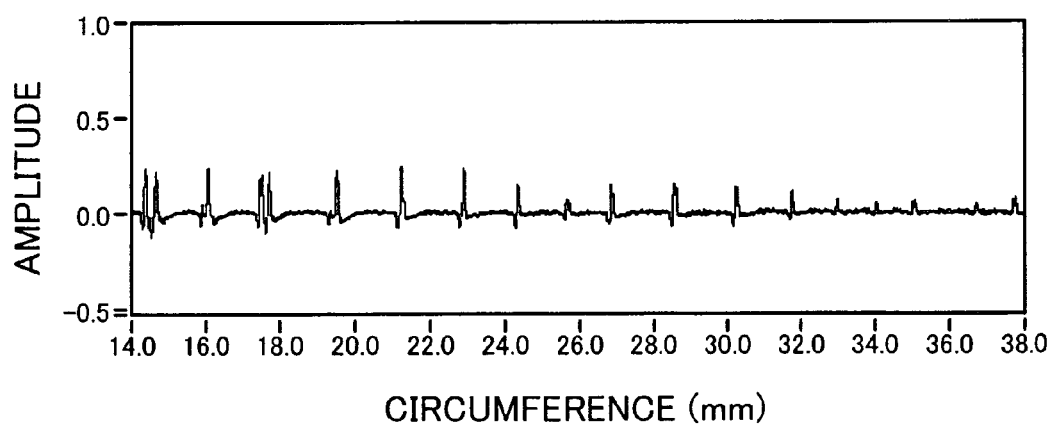
Figure 3A:
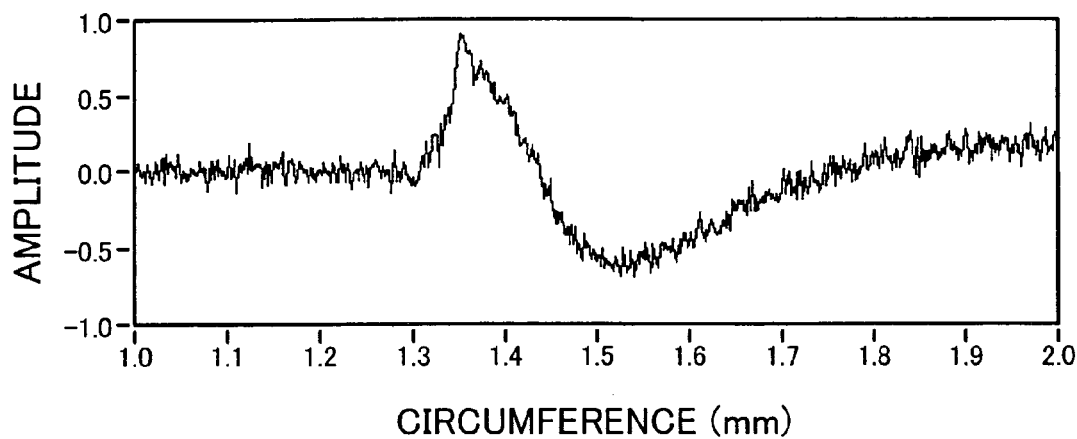
FIGS. 3A and 3B are figures showing in enlargement an example of spike noise and the cross-correlation function of same.
Figure 3B:
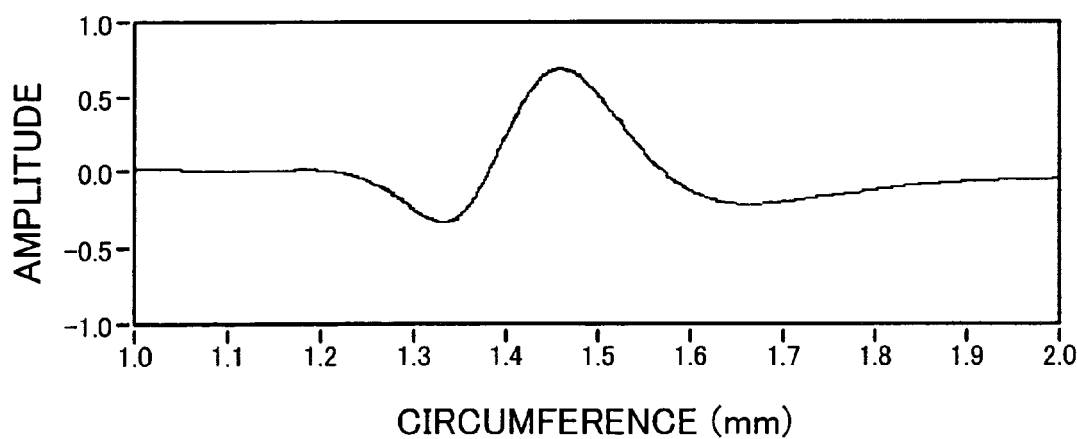
Figure 4:
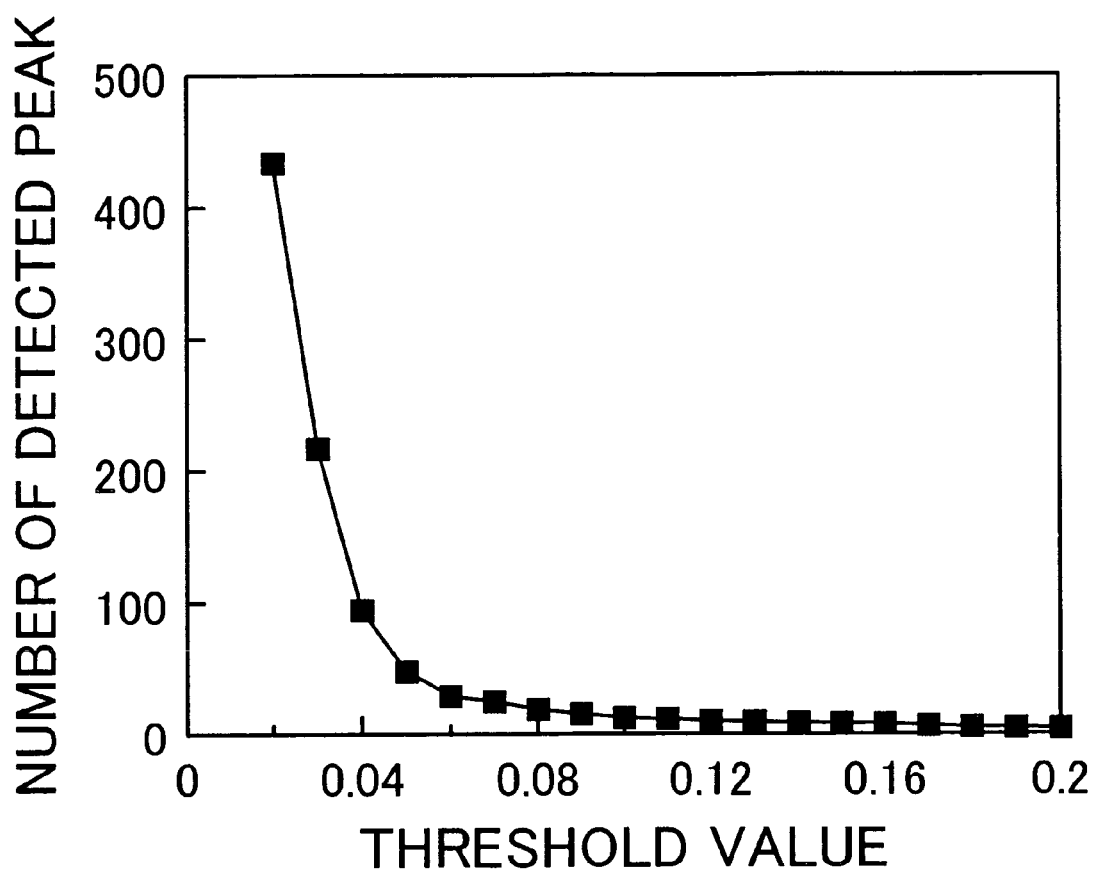
FIG. 4 is a figure showing the relation between the threshold value and the number of peak detections.
Figure 5:
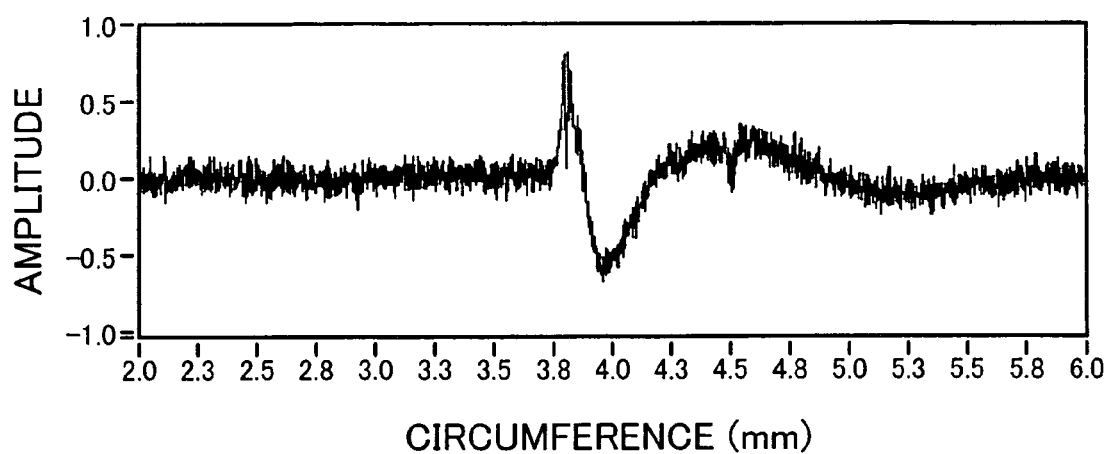
FIG. 5 is a figure showing a typical example of spike noise.
Figure 6:
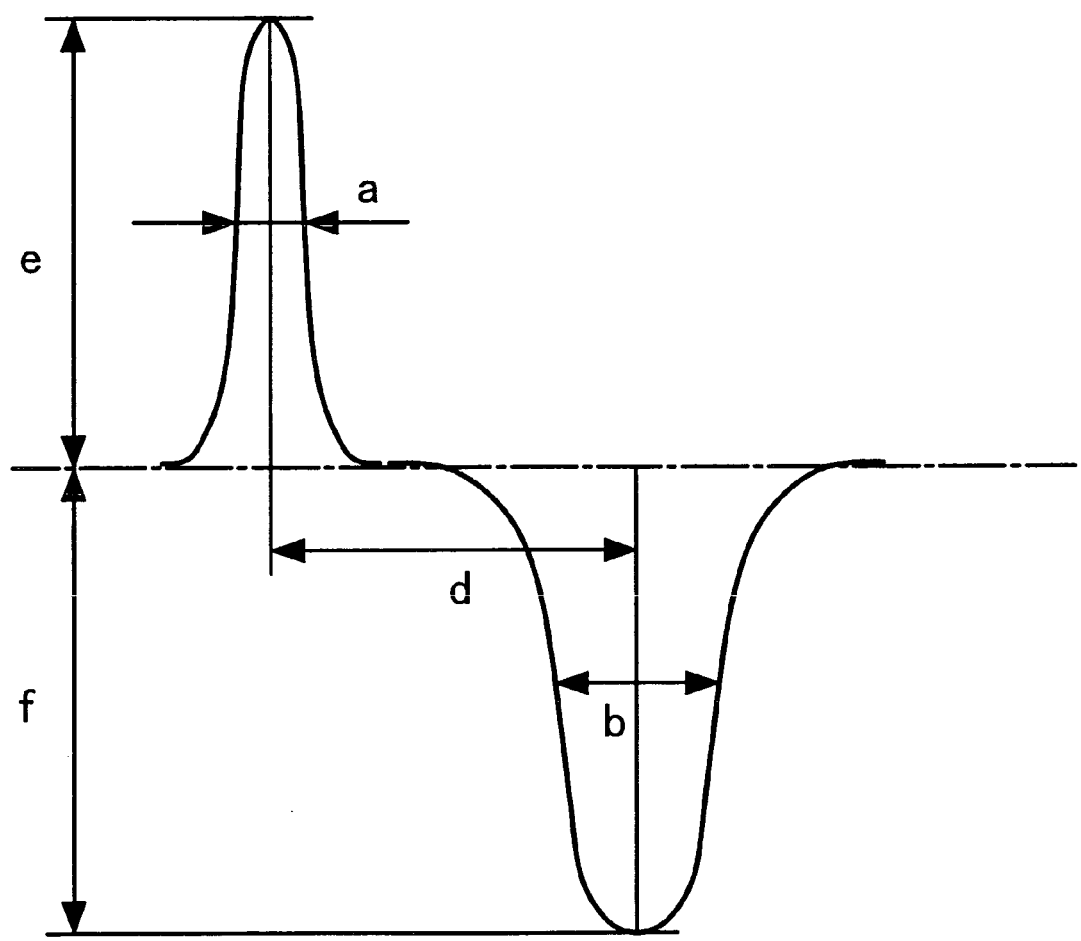
FIG. 6 is a figure explaining a dipulse-type waveform.

Below, embodiments of this invention are explained, referring to the drawings. In the following figures, parts with the same function are assigned the same symbols, and redundant explanations are omitted.

First Embodiment

FIG. 1 is a summary drawing showing one example of perpendicular magnetic recording media testing equipment of this invention. The testing equipment of this example is controlled overall by a computer 7. The computer 7, a digital storage oscilloscope 3, and a spin-stand control device 6 each incorporate a bidirectional bus interface, by which means these devices are interconnected. Of course another connection method, such as for example connections using a serial bus, may also be employed.

Testing operations are performed according to a test program incorporated in the computer 7. The test program first causes the spindle motor 4 to rotate at a prescribed revolution rate, via the spin-stand control device 6. Then, the head stage 5 is driven to load the head 1 at a prescribed radial position on the double-layer perpendicular magnetic recording media 8. The output signal from the head 1 is amplified by the head amplifier 2, and is input to the input terminal of the digital storage oscilloscope 3. The digital storage oscilloscope 3 acquires the amplified head output over a desired period of time, using the index signal from the spindle motor 4 as a trigger signal, and stores the output in memory. The stored head output waveform is transferred to the computer 7 by a read instruction issued by the test program. This series of data acquisition operations is performed each time the head 1 is moved to each radial position within a preset radial position range. Normally, the head 1 is often moved in the radial direction at equal intervals; but of course movement at unequal intervals is of course also possible. Hence at the time of completion of data acquisition operations, information is stored in the memory of the computer 7 concerning the two-dimensional distribution of spike noise.

Next, the test program detects spike noise from the stored waveform data, and creates a two-dimensional distribution figure based on the results. Detection of spike noise is performed for each waveform obtained from each radial position. Hence spike noise positions are shown for a radius and for a time from the index signal, that is, an angle from the rotation origin on the disk. A head output waveform captured by the digital storage oscilloscope is of course discrete along the time-axis, and so in the following explanation, unless stipulated otherwise, correlation functions and similar are all discrete along the time axis. Also, when mounting the test disk on the spindle, if the mark formed on the edge of the disk during disk fabrication by the substrate retaining fixture of the sputtering system is aligned with the spindle rotation origin, the position of spike noise can be represented as an absolute position on the disk.

Figure 7:
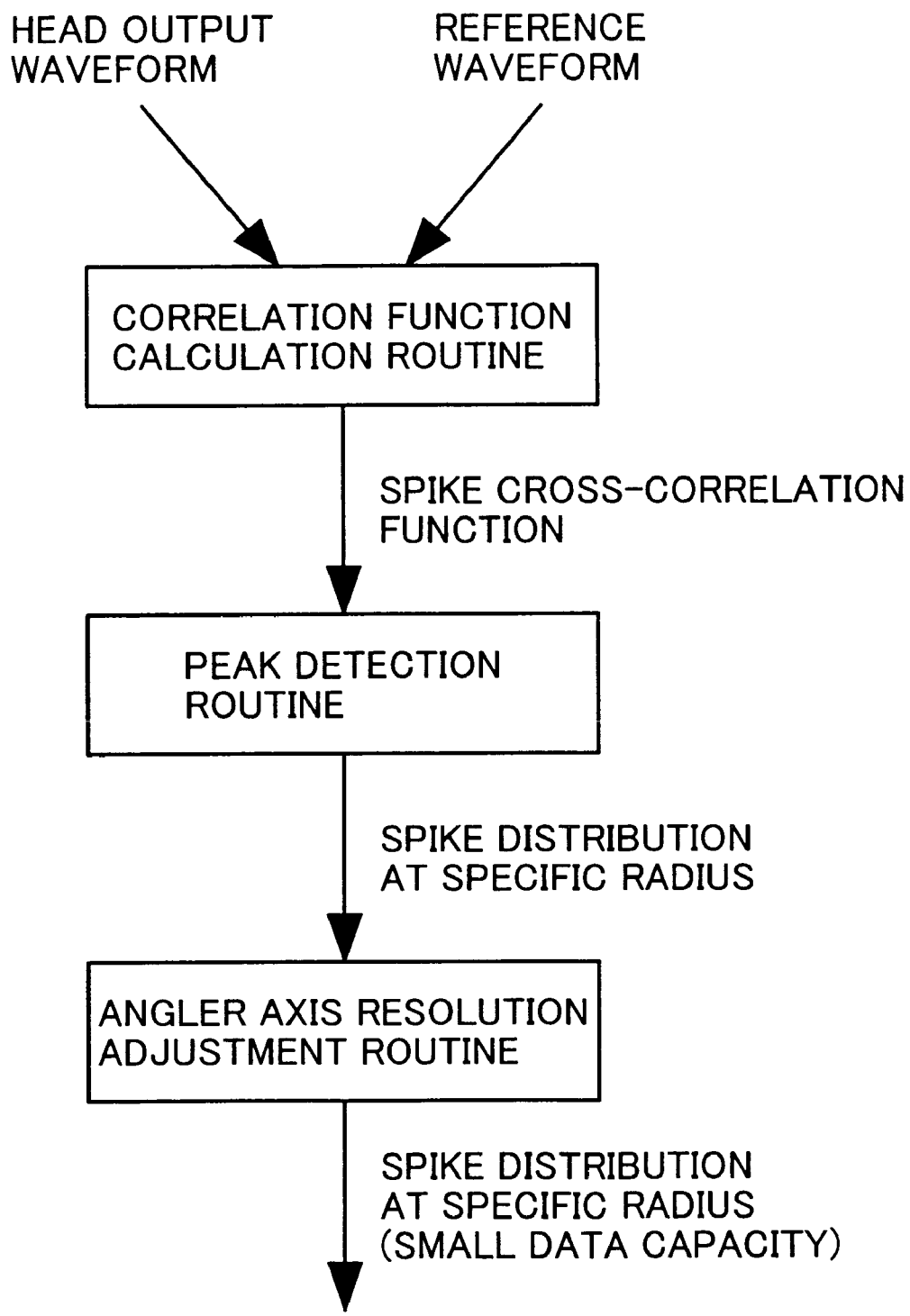
FIG. 7 is a figure explaining the process of spike noise detection.

Spike noise detection is performed according to the procedure shown in FIG. 7. The degree of similarity between a reference spike noise waveform, assumed in advance, and the head output is calculated, and based on this spikes are detected. Here, a cross-correlation function is used to calculate the degree of similarity between the reference spike noise waveform and the obtained head output waveform (correlation function calculation routine). Peak detection is then performed for the calculated cross-correlation function, and those features recognized as peaks are judged to be spike noise waveforms (peak detection routine). The quantity of data of the correlation function thus obtained is approximately equal to the amount of original data, and typically is several megabytes. This large quantity of data is inconvenient, both for storage and for use. However, although depending on the purpose for which the data is used, in general there are many cases in which, after spike noise detection, a high angular axis resolution is unnecessary. Here the angle-direction axis is divided into, for example, 500 to 1000 sections per revolution as necessary, the number of spike noise peaks existing in each of the sections is counted, and results are displayed using colored points corresponding to the number (angular axis resolution adjustment routine). Through such operations, the amount of data can be greatly reduced.

One feature of this method is the fact that, in the process of calculating the cross-correlation function, the noise amplitude arising from media noise and from electrical circuits, and unrelated to spike noise, is suppressed, so that the effect of these noise sources is greatly reduced during peak detection.

Figure 8:
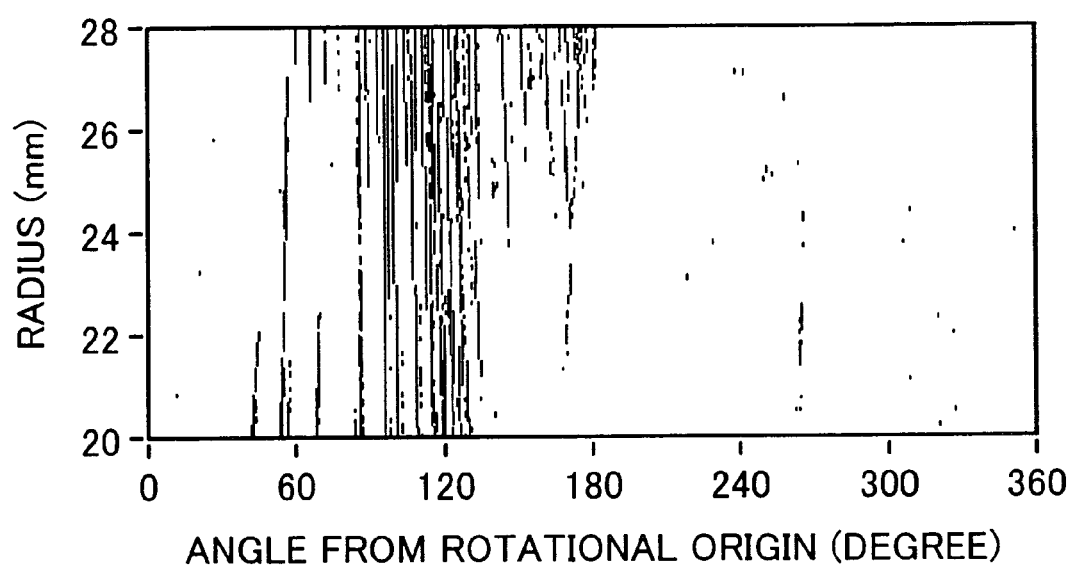
FIG. 8 is a figure showing an example of the result of calculation of the spike noise distribution.

FIG. 8 shows an example of a spike noise distribution diagram actually obtained using the equipment and procedure described above.

Figure 9:
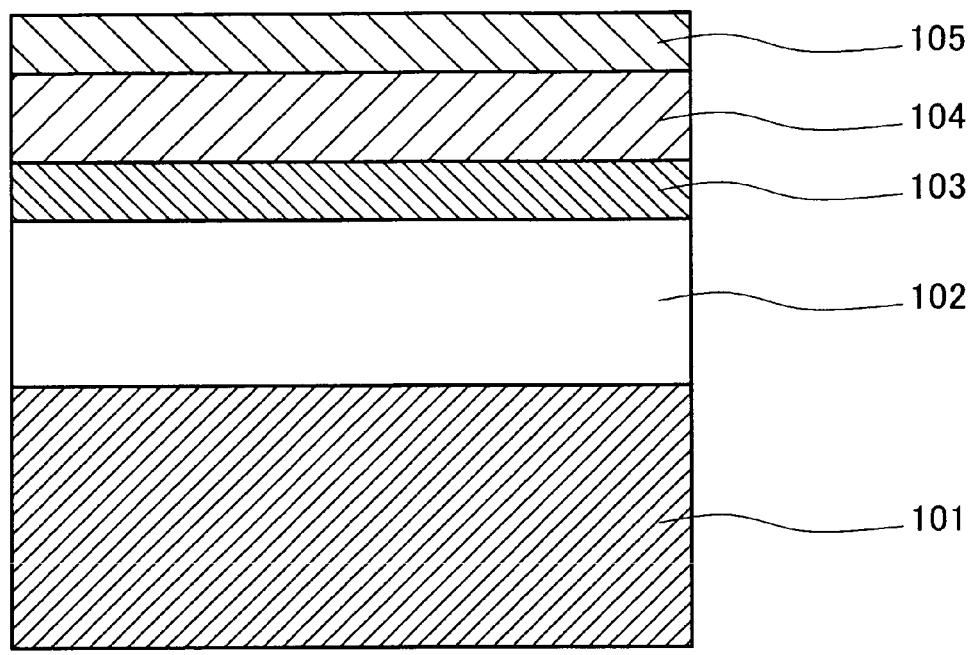
FIG. 9 is a figure explaining the film structure of perpendicular magnetic recording media used in experiments.

The double-layer perpendicular magnetic recording media evaluated has the film structure shown in FIG. 9, and was fabricated by the following method. DC magnetron sputtering was used to form a Co-3 at % Ta-5 at % Ze film to a thickness of 400 nm, as a soft magnetic layer 102, on a glass substrate 101 of diameter 65 mm. On top of this, a Co-22 at % Cr-14 at % Pt film was formed to thickness 20 nm as the recording layer 104, and on this a C film was formed to thickness 5 nm as a protective film 105.

The magnetic head used in evaluations employed a magnetoresistance effect element as the playback element; the shield gap was 0.2 μm, and the track width was 1.3 μm. This head and the above-mentioned double-layer perpendicular magnetic recording media were mounted on the spin-stand, and experiments were conducted. In these experiments, the rotation velocity of the media was held constant at 3000 rpm. Measurements were conducted at 100 μm intervals between an inner circumference of radius 20 mm, and an outer circumference of radius 28 mm. The head position was adjusted such that the skew angle was 0° at all radial positions.

The width of the spike waveforms of spike noise varied depending on the material and thickness of the soft magnetic layer, the head used, the angle made by domain walls and the head, and other factors; but when using an amorphous Co—Ta—Zr soft magnetic material film of thickness approximately 400 nm as the soft magnetic layer, the width was typically 100 to 300 µm. Hence when using media of diameter 65 mm, in order to capture such spike noise waveforms, the requirements of the sampling theorem require that the sampling interval be smaller than 50 µm. In this case, the maximum circumference length is approximately 200 mm, and so in order to capture the data of one media circumference at this radius, a minimum of 4000 points are required. When considering the number of points necessary to adequately represent the features of the reference waveform, 100,000 sampling points are necessary per circumference. If the data volume per sample is one byte, then if data is acquired in 0.1 mm intervals from radii of 20 mm to 28 mm, the total data volume is approximately 7.7 megabytes, a huge amount. As explained above, depending on the purpose for which the data will be used, after detection of spike noise, there are many cases in which high resolution of the angle axis is unnecessary. For example, when judging pass/fail for the media based on whether there exists a radius, in a fixed range or beyond, in which there are no encounters with spike noise, the resolution in the angle direction clearly is not important after the spike noise position has been calculated.

In this embodiment, one object is to obtain a diagram of the broad distribution on the media of spike noise; hence after detecting spike noise, the angular-axis direction is divided into 500 sections, the number of spike noise occurrences in each section is counted, and when one or more exists, they are represented by a black point. FIG. 8 is a diagram obtained in this way. In the case of FIG. 8, whereas the original data volume was approximately 7.7 megabytes, the volume of data in FIG. 8 is approximately 40 kilobytes, since the angular-direction resolution is 500 points. As the reference spike noise waveform used in the process of obtaining FIG. 8, a single-pulse waveform, expressed by the above equation (4), was used.

Peak detection was performed by a method which regards as peaks those maxima in the spike correlation function for which the spike correlation function before and after the maximum exceeds a set threshold value for at least a fixed length of time.

As the most general formats for data storage following spike noise detection, storage as distribution coordinate data, in a state in which the resolution used in drawing FIG. 8 is reduced, or as image data like that of FIG. 8, is possible. In addition, the peak position coordinates of spike noise can be recorded as binary data or as text data. Here, if the data is represented using the same angular axis-direction resolution as when calculating the position coordinates of spike noise from the cross-correlation function, particularly when there are infrequent appearances of spike noise, positions can be recorded using even smaller data quantities than in the methods described above, and with high position resolution maintained. Also, in addition to the position of the spike noise, the amplitude of the peak waveform (spike correlation function) judged to be spike noise, as well as the half-maximum width of the peak waveform, the amplitude of the head output waveform, and other data can also be recorded as necessary.

By assuming a specific shape such as a dipulse-type waveform like that expressed by equation (3) instead of the single-pulse shape of equation (4) as the reference spike waveform, only spike noise exhibiting a waveform of a specific shape is detected, so that types of magnetic domain walls can for example be classified.

As explained above, the absolute values of such reference waveform parameters as the shape and width are not so important, and it is sufficient to use either a waveform observed in advance, or a predicted waveform. For example, if conditions are the same as in the actual observation example above, by using a single-pulse type reference waveform such as that described by equation (4) with a half-maximum width of 100 µm, nearly all spike noise can be detected. However, in the above example, the cross-correlation function is calculated using the same reference spike noise waveform, even at different radii. Hence in this method, because the angular velocity of media rotation during measurements is fixed, the effective length of the reference spike noise wavelength changes considerably from the inner circumferences to the outer circumferences. If the measurement radius extends over a broad range, for example from 15 mm to 30 mm, it may not be possible to ignore this effect. In order to avoid such circumstances, the reference spike noise waveform is calculated for each radius such that the length of the reference spike waveform is constant at each radius. That is, the width and shape of the reference waveform is stipulated in advance, using actual dimensions. As one simple example, there is a method in which, based on the optimized reference spike noise waveform at a given radius, the values of each of the elements of the reference spike noise waveform array at another radius are calculated by interpolation. Using this method, a reference spike noise waveform suited to each radius can be calculated easily and rapidly, even when the reference spike noise waveform is not given by a numerical formula.

Hence the actual procedure is as follows. First, the width and shape of the reference waveform are stipulated using actual dimensions. Next, the procedure described above is used to capture the head output waveform at each of the radii within the test range. Then, the correlation function is calculated for each radius, and peak positions are determined. At this time, the reference waveform determined by the method explained above is used as the reference waveform for each radius.

As test results, in addition to a display of the spatial distribution of spike noise like that of FIG. 8, the number of spike noise occurrences encountered by the head for each measurement radius can be represented numerically, and the total number of spike noise occurrences observed, the frequency distribution for a peak amplitude of the correlation function, and other results can be calculated. Pass/fail decision conditions can be set for each of these independently or in combination.

It is certain that much spike noise is due to leakage magnetic fields from the walls of magnetic domains formed in the soft magnetic layer. However, a not insignificant amount of the spike noise detected is only observed as points in a two-dimensional distribution diagram. These occurrences are thought to arise not from simple magnetic domains, but from faults in the soft magnetic layer. Regardless of the origin, the extent of the effect in actual magnetic disk devices of spike noise observed as points and spike noise observed as lines in a two-dimensional distribution diagram is different, and so the two should be classified differently. That is, whereas point-shape occurrences affect only a few tracks, line-shape occurrences affect an extremely large number of tracks. These results can also be used in final pass/fail decisions of tested disks.

Numerous methods can be used to discriminate between the two. Below, one example is explained. First, an exhaustive list of all the coordinates of pixels at which spike noise exists is created. One element is taken from this list, and the list is examined to determine whether the coordinates of pixels neighboring this pixel are on the list. The element thus taken is removed from the list. If such a neighboring pixel is discovered, the discovered pixel is also deleted; and the list is again examined to determine whether the coordinates of pixels neighboring the discovered pixel are recorded on the list. This is repeated until neighboring spike noise coordinates are no longer discovered; and whether the occurrence is point-shaped or not is discriminated by whether the number of repetitions exceeds a stipulated value. The coordinates of spike noise judged to be connected in a line are recorded on a new list, for each connected line. The above process is repeated until the original list is empty. When extracting a new element from the original list, if it is anticipated that the spike noise will exhibit a radial distribution, possibly because the anisotropy of the soft magnetic layer is directed in the disk radial direction, this operation is begun from an innermost or from an outermost circumference, and when searching for neighboring elements, priority is given to the radial direction. By this means, elements neighboring in the circumferential direction are less likely to be confused. At present, the criterion for finally judging an occurrence to be a line-shaped spike noise series is 300 µm. This is because radial movement steps during measurements are normally 100 µm, and because one condition is that at least three points be neighboring, in order to reduce the probability of error.

In this embodiment, calculations to detect spike noise are performed after acquiring all information across the entire disk; but obviously calculations can also be performed upon measurement at each radius. Also, in this embodiment, the calculations are performed by software employing the standard calculation methods of a computer; of course, specialized hardware, digital signal processors, and similar can also be used. And, in this embodiment data is captured at each specified radius; of course, the disk surface can also be scanned helically, continuously capturing waveforms while continuously causing the head to seek new positions on the disk.

In the above example, the angular velocity of media rotation was held constant; however, measurements can also be performed with the linear velocity held constant. In this case, sampling intervals are always equal even at different radii, so that the reference waveform width can be held fixed. Also, because the head flying height does not change, there is the feature that the spike noise detection sensitivity does not change with the radius, even over a broad range of measurement radii.

In FIG. 1 and subsequent explanations, for simplicity, evaluation of only one side of a disk is described; of course equipment used in actual production lines can be designed such that both sides of a disk are evaluated simultaneously. That is, two heads can be mounted on a head stage such that measurements can be performed simultaneously on both sides of the disk, and two channels of the head amplifier and other electric circuitry are provided. Either a digital oscilloscope which, in addition to the index signal input, has two or more channels is used, or else a plurality of oscilloscopes, with equivalent performance, are used. In order to perform inspections more rapidly, of course a plurality of heads may be mounted per disk side, and each head may be operated in parallel. In this case, the necessary number of circuits and measurement instruments are of course installed.

Second Embodiment

Figure 10:
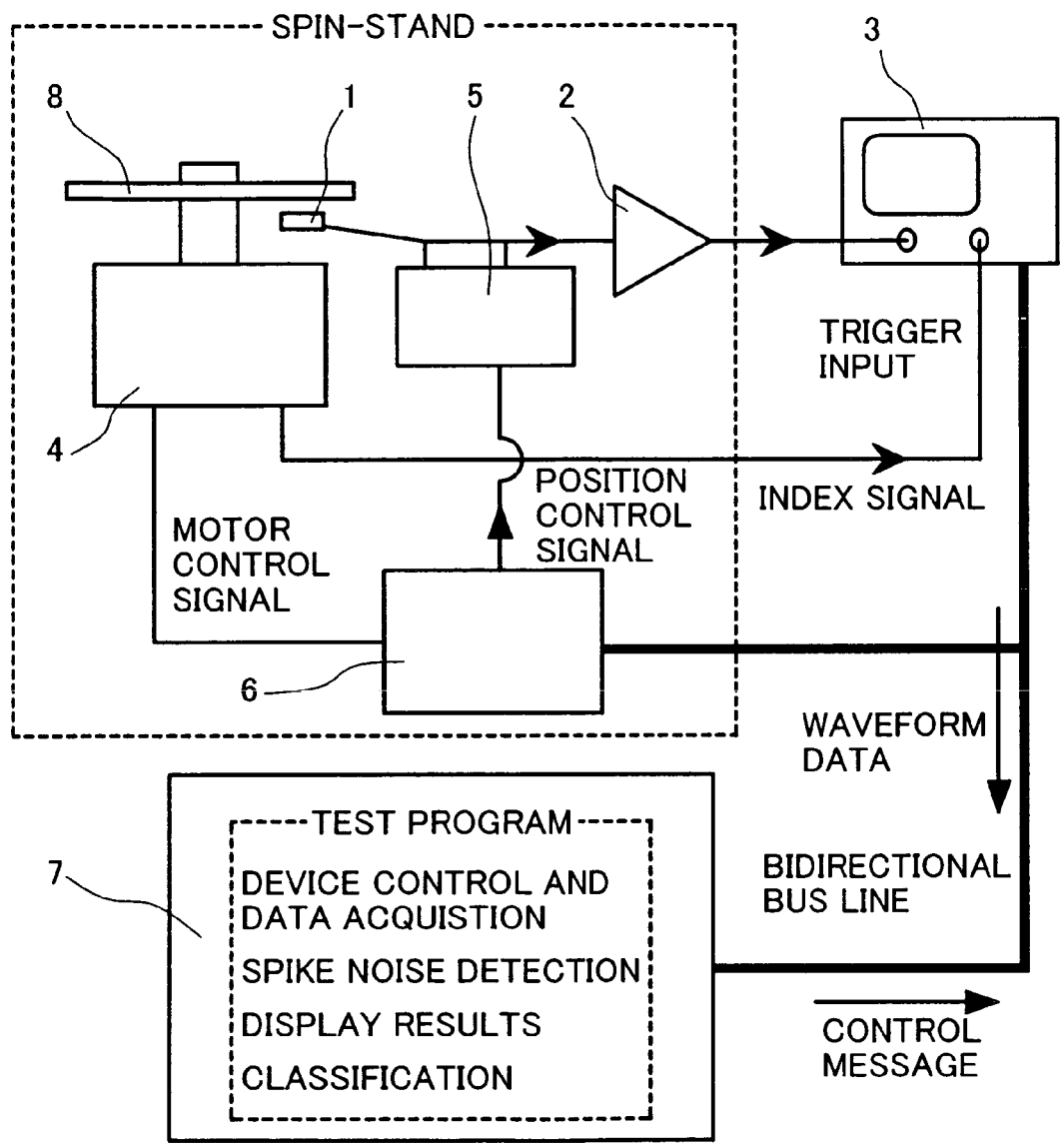
FIG. 10 is a figure showing an example of perpendicular magnetic recording media testing equipment capable of pass/fail decisions.

FIG. 10 is a figure showing in summary another example of inspection equipment used in executing a perpendicular magnetic recording media testing method of this invention. The equipment configuration of this embodiment is the same as in the first embodiment, but this embodiment differs in that a media quality decision function is added to the test program.

As one of the simplest criteria for decision of quality, a condition for passing might be that the number of spike noise occurrences in a specified radius, or the number of spike noise occurrences within a specified radius range, be less than a fixed number. However, the details and conditions for quality decision will differ depending on the quality standards to be satisfied by the disk. It is possible to set decision conditions by combining the results of analysis functions described in the first embodiment, so that an exceedingly great variety of circumstances can be accommodated. Moreover, consideration is paid such that the details and conditions for quality decision can easily by modified by changing the decision routines and decision conditions.

Figure 11:
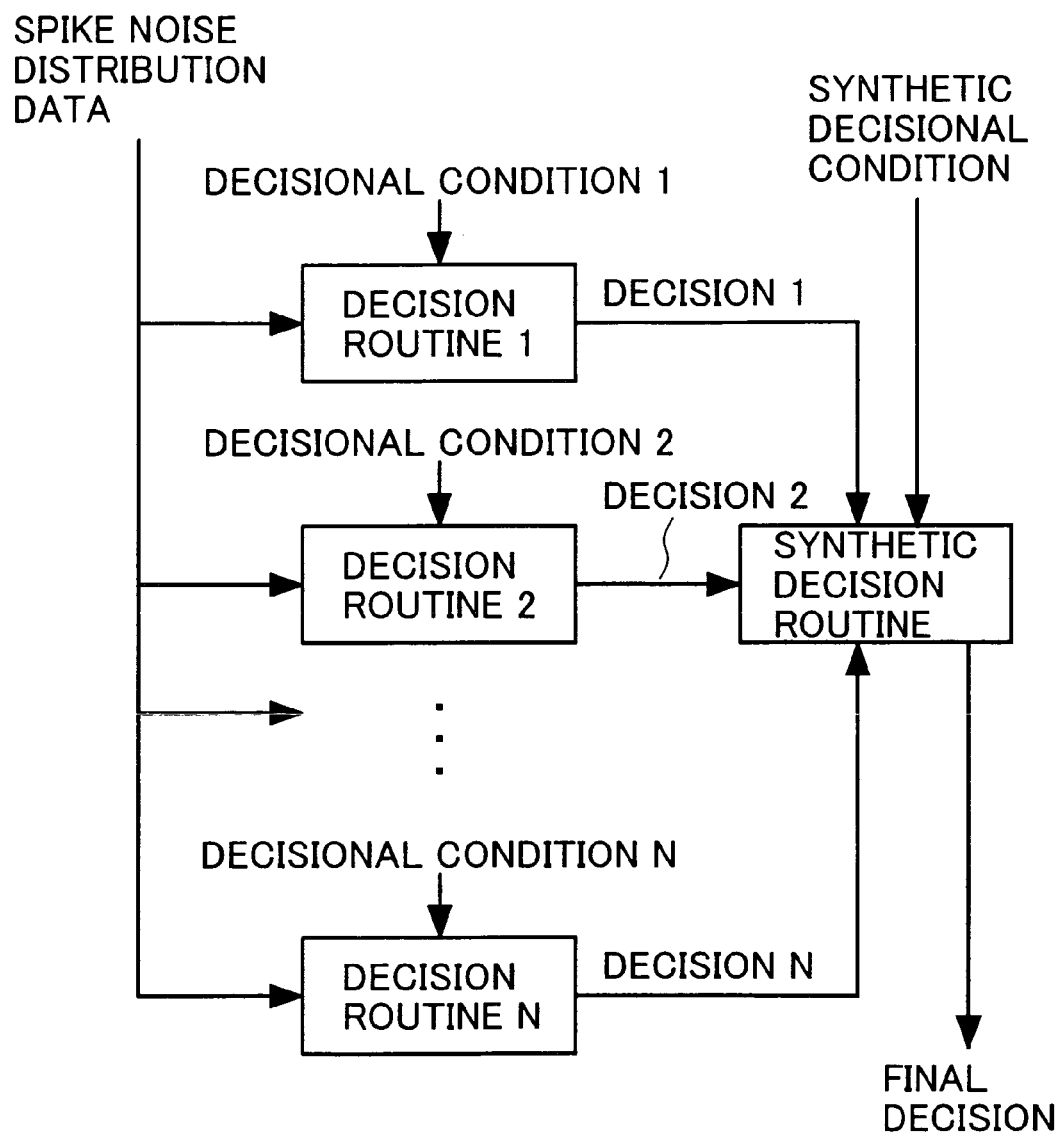
FIG. 11 is a figure explaining the procedure for pass/fail decision.

FIG. 11 shows a summary of the operation of the quality decision routines in the test program. Decision routines can be set corresponding to a plurality of decision details; the number and details can be modified through simple revisions to the program. Decision routines 1 through N judge quality referring to the spike noise distribution obtained as a result of measurements and the amplitude and other preset decision details and conditions, and perform rankings according to the results. In the synthetic decision routine, a synthetic decision method is defined in terms of the priority of each decision detail and interrelations of same; a final decision is made using the decision results of each decision routine, and a final ranking is assigned.

When using the inspection equipment of this invention in an actual production line, the equipment is of course combined with a robot device which automatically changes disks. Classification of the spike noise evaluation results between passing and failing is performed immediately after this stage. In some cases, in addition to simple classification into passing and failing items, ranking may also be performed as necessary based on the inspection results.

Third Embodiment

Figure 12:
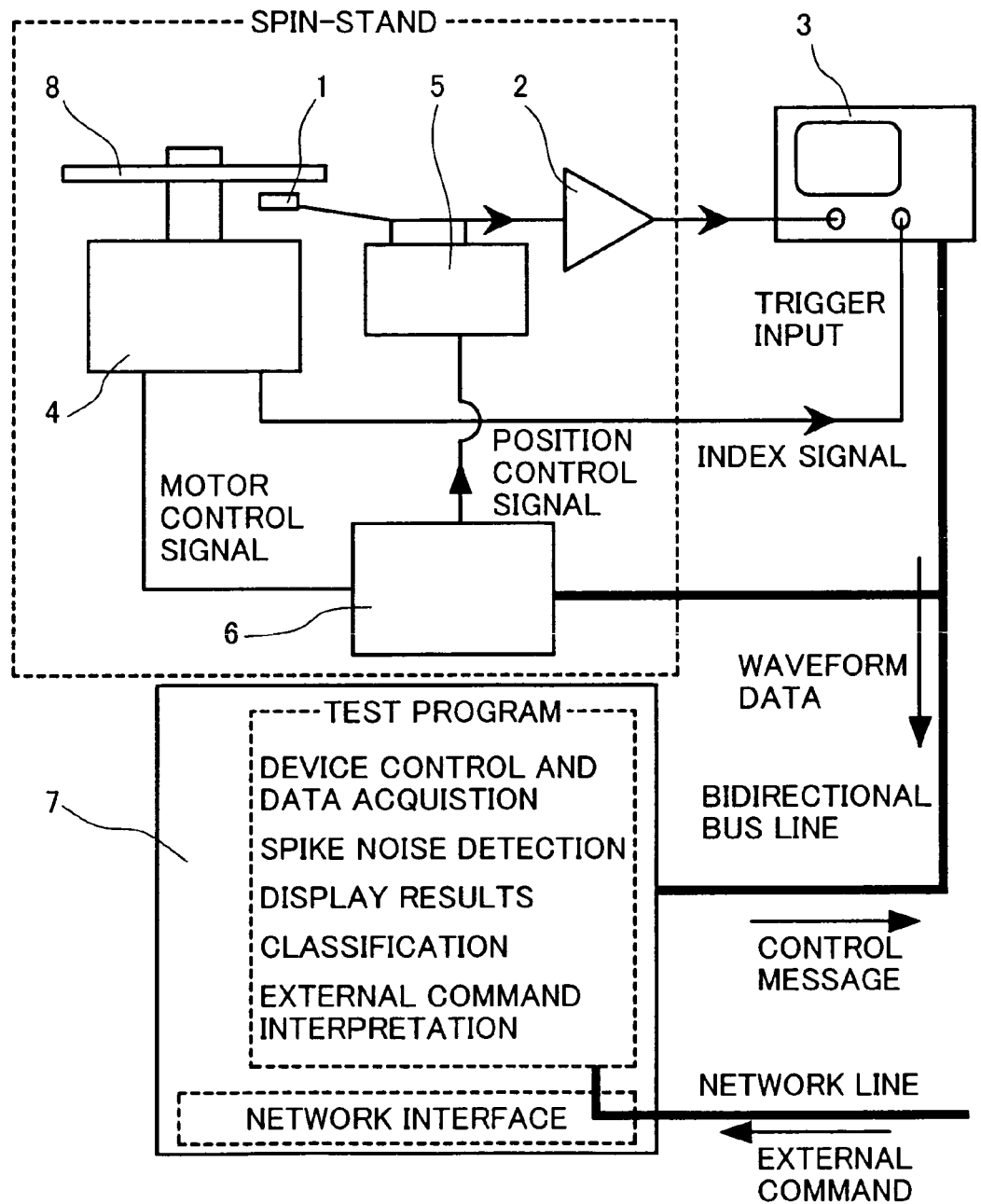
FIG. 12 is a figure explaining perpendicular magnetic recording media testing equipment which can be connected to a network.

FIG. 12 shows still another example of testing equipment used in executing a perpendicular magnetic recording media testing method of this invention. In this example, the control computer 7 comprises a network interface, and instructions and data can be sent to and received from others computers, measurement equipment, output devices and similar over the network. The test program comprises functions for interpreting and executing external instructions sent from other computers or other devices. Here, external instructions are defined within the test program, and the test program can be instructed to execute or interrupt tests, modify test conditions, and similar. Hence remote operations from other computers over the network are possible. It is not necessary to use a dedicated network interface in configuring a network; the bidirectional bus interface with which the device shown in FIG. 1 is equipped can also be used. Through these features, operations such as the following are possible as necessary.

A single control computer can manage a plurality of spike noise testing devices in a manufacturing line or similar. Also, data management can be unified and made easier. Or, another computer can be made to handle operations involving large loads such as spike extraction. By this means, the time required for evaluation can be shortened, and productivity can be improved. Also, by replacing the computer of the spike noise testing equipment with a less powerful machine, costs can be reduced. And, the spike noise testing equipment need not be a dedicated device, but can also be used as a read/write tester.

When having another computer handle spike noise extraction or other operations involving large loads, the spike noise testing equipment and computer need not be connected by a network, and of course head output data can be transported between them by means of removable storage media or similar.

Fourth Embodiment

As mentioned in the first embodiment, depending on circumstances, phenomena apparently similar to spike noise such as thermal asperity may be observed. Thermal asperity is a phenomenon in which pulse-shape pseudo-signals appear when minute protrusions on the disk and dust particles make contact with the magnetoresistance effect head element.

The frequency with which thermal asperity is observed is not normally so very high; but the measures which should be taken in response to thermal asperity arising from the disk surface shape and spike noise are of course different, and so depending on the purpose of the testing, it may be necessary to distinguish the two. This can be achieved by utilizing the following characteristic of spike noise.

Figure 13A:
FIGS. 13A and 13B are figures explaining the directional dependence of the spike noise DC erasure magnetic field.
Figure 13B:

FIGS. 13A and 13B show an example of observation with an analog oscilloscope of part of the spike noise in media described above. The time-axis scale is the same 100 μs per grid for both FIG. 13A and FIG. 13B. Both FIGS. 13A and 13B show the results of observation of spike noise (three occurrences) in the DC-erased state, but the sign of the current passed in the recording head during DC erasure was different. As seen in FIGS. 13A and 13B, the waveform of the spike noise changes with the sign of the current during DC erasure of the media, that is, with the direction of magnetization in the recording layer. Although there is some change in the amplitude and waveform in many cases, the polarity of the spike waveform also is reversed according to the direction of magnetization. But in the case of thermal asperity arising from the disk surface shape and from dust, the waveform polarity is not inverted even if the sign of the DC erasure current is reversed. Also, in many cases the spike noise waveform is a dipulse-type shape having positive and negative peaks, as seen in FIGS. 13A and 13B, rather than a single-pulse waveform.

Hence the simplest method for discriminating spike noise and thermal asperity is as follows. At an arbitrary measurement radius position on the disk, a measurement magnetic head is used to perform DC erasure by applying a sufficiently large magnetic field in a given direction, and then spike noise is evaluated by the method described above. At this time, a dipulse-type reference waveform is used. Next, DC erasure is performed at the same radius with the magnetic field reversed during the DC erasure, and spike noise is then similarly evaluated. A dipulse-type reference waveform is used, so that when the cross-correlation function of the signal waveform and reference waveform is calculated, spike noise is detected only once in the two measurements.

Figure 14:
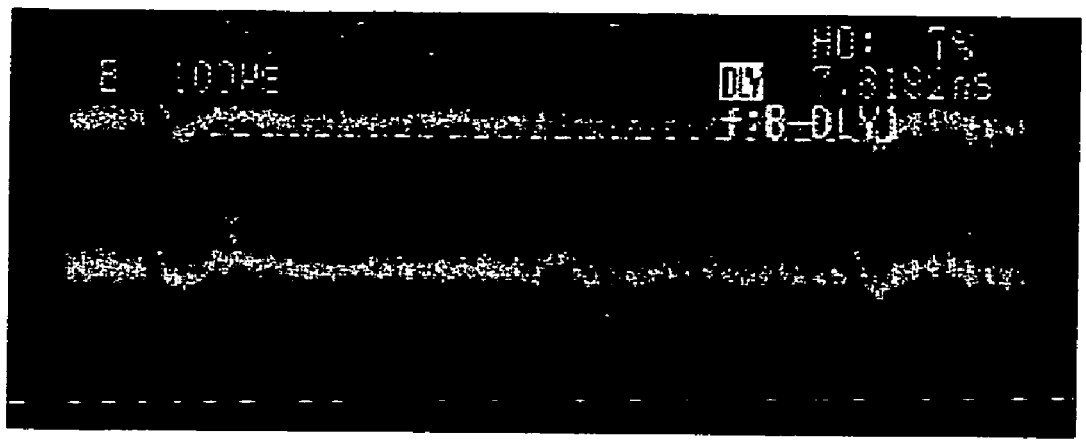
FIG. 14 is a figure explaining the manner in which playback signals are modulated by spike noise.

FIG. 14 shows the results of observation with an analog oscilloscope of the same location on the same media observed in this embodiment using equipment combining the functions of a read/write tester, after recording a signal with a magnetization transition interval of 254 nm. The amplitude of playback signals is seen to be modulated at the position at which spike noise was observed. After a spike noise position is identified, the signal-to-noise ratio at the position and in the vicinity was measured, and it was estimated that the signal-to-noise ratio is reduced by approximately 6 dB compared with areas in which there is no spike noise.

Fifth Embodiment

Figure 15:
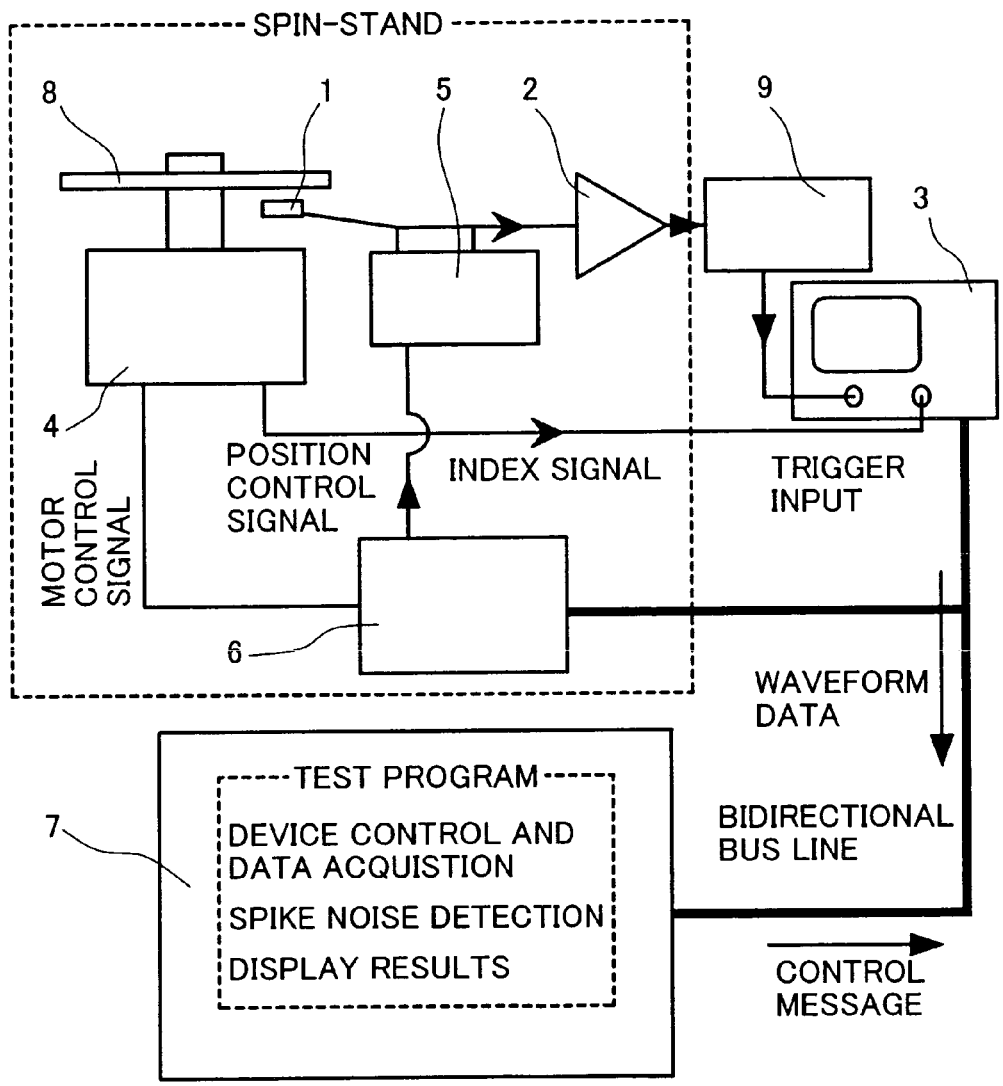
FIG. 15 is a figure showing an example of another configuration of perpendicular magnetic recording media testing equipment.
Figure 16:
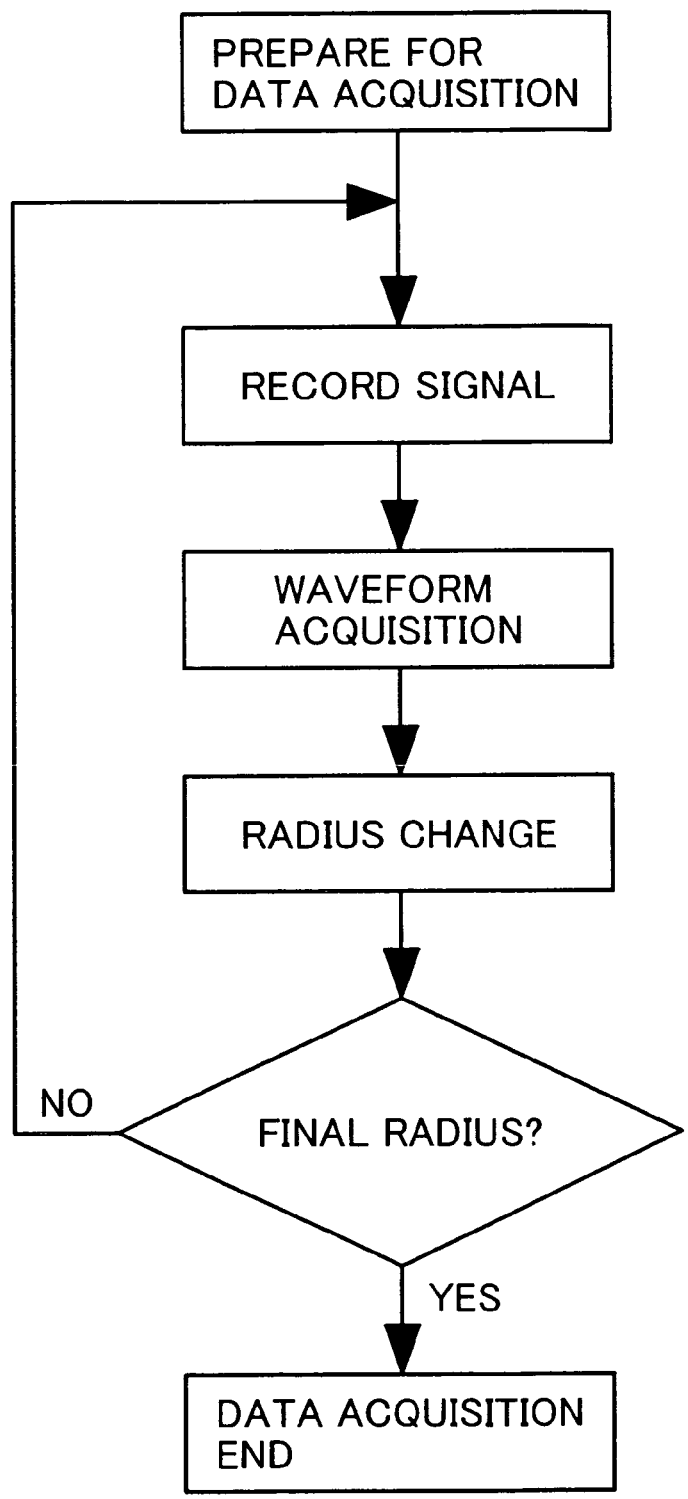
FIG. 16 is a figure explaining the procedure for acquisition of envelope waveform data for a playback signal.

FIG. 15 is a summary diagram showing another example of testing equipment used in execution of the perpendicular magnetic recording media testing method of this invention. The testing equipment of this invention comprises a discriminator 9 to discriminate the types of influence of spike noise on playback signals. The procedure for testing can be broadly divided into a data acquisition stage and a discrimination stage. FIG. 16 shows the procedure of the data acquisition stage. Testing operations are performed according to the test program incorporated in the computer 7. Below, the procedure is explained together with the equipment operation.

The test program first rotates the spindle motor 4 at a prescribed revolution rate via the spin-stand control device 6, and drives the head stage 5 to load the head 1 at a desired radial position of the double-layer perpendicular magnetic recording media 8. Signals are then recorded using a write current specified in advance, at a recording wavelength specified in advance.

The playback output signals of the head 1 are amplified by the head amplifier 2, and after passing through the discriminator 9, are input to the signal input terminal of the digital storage oscilloscope 3. The discriminator 9 is a circuit which detects the envelope of the playback signal, that is, which continuously detects the amplitude. This operation is discussed further below. The digital storage oscilloscope 3 acquires and stores in memory the amplified head output over a desired time, using as a trigger signal the index signal from the spindle motor 4. The stored discriminator output waveform is transferred to the computer 7 in response to a read instruction issued by the test program. This series of data acquisition operations is performed each time the head 1 is moved to one of the radial positions within a preset range of radii. Normally, the head 1 is often moved by equal intervals in the radial direction, but of course can also be moved by unequal intervals. Hence when the data acquisition operation ends, information regarding the envelopes of playback signals for each radius is stored in the memory of the computer 7.

The test program extracts the effects on the playback signal of spike noise from the data acquired in the above data acquisition stage, discriminates the types of effect, and if necessary creates a two-dimensional distribution diagram from the results. Extraction of the effects of spike noise from the acquired data is performed for waveforms obtained at each radial position. Hence the positions of points at which there is an effect of spike noise are represented as a radius and a time from the index signal, that is, an angle from the rotation origin on the disk. When mounting the disk for testing on the spindle, if the mark formed on the edge of the disk during disk fabrication by the substrate retaining fixture of the sputtering system is aligned with the spindle rotation origin, the position of a point affected by spike noise can be represented as an absolute position on the disk.

In this embodiment, calculations to extract the effect of spike noise are performed after acquiring all the information across the disk; but calculations may also be performed at each measurement radius. Also, in this embodiment software employing standard computer calculation methods is used in calculations; but dedicated hardware, a digital signal processor, or similar can also be used. And, in this embodiment data is acquired for each specified radius; of course the disk surface can also be scanned helically, continuously capturing waveforms while continuously causing the head to seek new positions on the disk.

Figure 17:
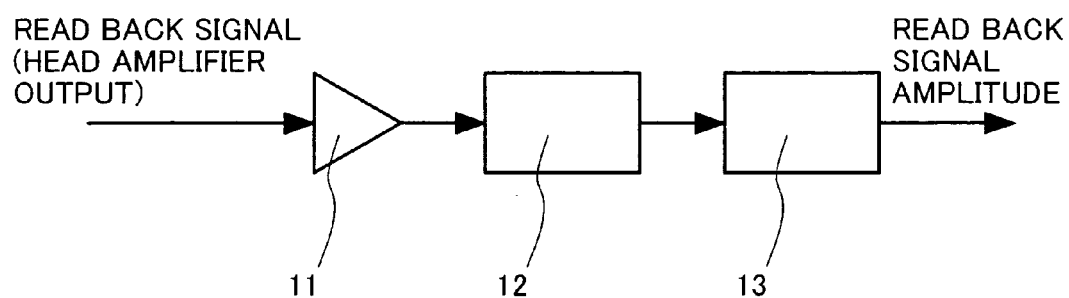
FIG. 17 is a figure showing an example of the configuration of a discrimination circuit capable of eliminating baseline shift.

A plurality of configurations for the discriminator 9 are conceivable. The circuit of FIG. 17 is an example of the simplest circuit configuration. After amplifying the head amplifier output to an appropriate level using the amplifier 11, the output passes through a high-pass filter 12. By appropriately selecting the cutoff frequency of the high-pass filter 12, the baseline shift of the playback signal due to spike noise can be eliminated. Although depending on the type of media and on measurement conditions, when the head-media relative velocity is 9 m/s, when using a second-order Bessel-type high-pass filter, a cutoff frequency of approximately 500 kHz to 1 MHz is appropriate. Here a baseline shift is a phenomenon in which the average value of the playback signal is locally shifted in the positive or negative direction compared with other areas, due to superpositioning on the playback signal of a frequency component differing from the playback signal (normally, a component at a far lower frequency than the playback signal).

Next, the output of the high-pass filter 12 is input to the envelope detector 13. If the time constant of the envelope detector 13 is selected appropriately with respect to the playback signal frequency, the envelope of the playback signal, that is, the amplitude signal can be obtained. Hence by detecting a valley in the output waveform of the discriminator, the amplitude modulation due to spike noise can be identified. Here, amplitude reductions due to other media defects or other factors, and not caused by spike noise, may be simultaneously detected. However, in general, there is a tendency for the range on the media over which the playback signal amplitude is modulated by spike noise to be from tens of microns to hundreds of microns, much broader than for the case in which noise is due to loss in the recording film or similar. Hence while discrimination with absolute certainty is not possible, modulation of the playback signal amplitude by spike noise can be identified with a considerable degree of certainty. It is also possible to measure the spike noise distribution, and perform discrimination referring to the results. However, from the standpoint of fault inspection, if areas in which the playback signal amplitude is decreased are to be recognized as defective, it is sufficient to discriminate as defects areas in which the playback signal amplitude is reduced below a certain criterion, regardless of the cause, and so discrimination of the cause is not necessarily important.

The construction and principle of operation of an envelope detector is for example described in detail on pp. 125 to 126 of *Communication Systems* by B. P. Lathi, published by McGraw-Hill Book Co., Sep. 1, 1977. However, the envelope detector used in this testing equipment need not have the configuration described in the above publication, and may adopt another form, so long as the envelope of the playback signal can be detected. Moreover, a rectifying detector or similar can also be used. Also, in FIG. 17, the high-pass filter 12 may be positioned before the amplifier 11 instead.

Figure 18A:
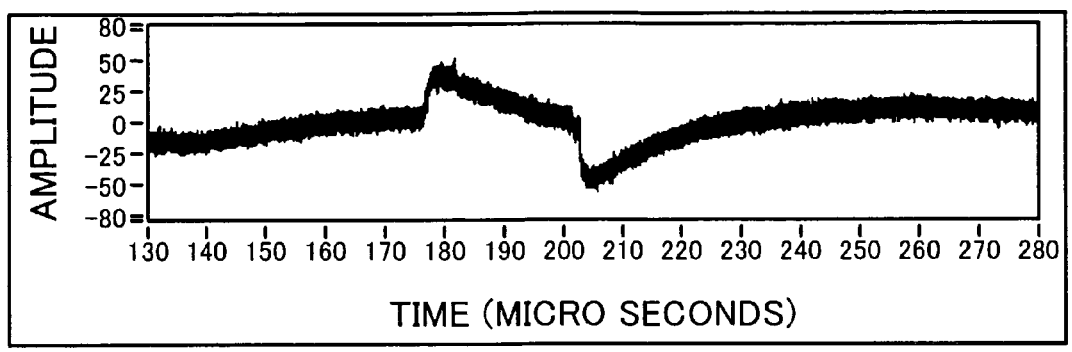
FIGS. 18A, 18B and 18C are figures showing an example of observation of baseline shift due to spike noise.
Figure 18B:
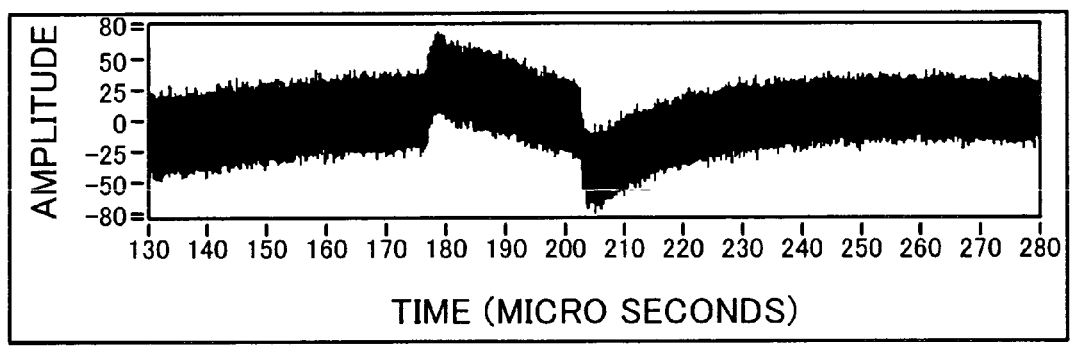
Figure 18C:
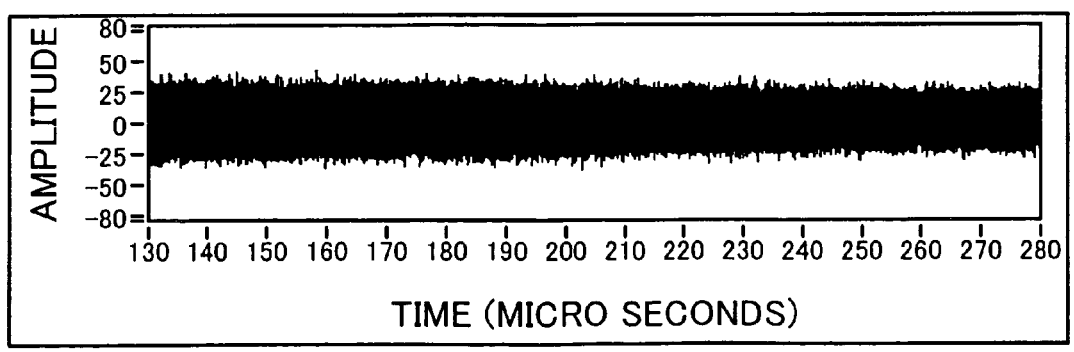

FIGS. 18A, 18B and 18C show an example of the baseline shift of the playback signal due to spike noise. The evaluated double-layer perpendicular magnetic recording media is that explained in FIG. 9. The magnetic head used in evaluations employs a magnetoresistance effect element as the playback element; the shield gap is 0.2 µm, and the track width is 1.3 µm. This head and the above-described double-layer perpendicular magnetic recording media were mounted on a spin-stand, and experiments were conducted.

FIG. 18A is the head output waveform in the DC-erased state, in which an area near a spike noise occurrence is observed. FIG. 18B is the result of observation at the sample observation place as in FIG. 18A, after recording a signal. The linear recording density was 100 kFCI. At the position of spike noise, the playback signal baseline can be seen to be shifted gently along the spike noise waveform. FIG. 18C shows the results for the same place as in FIG. 18A and FIG. 18B, observed after passing through a high-pass filter with a cutoff frequency of 500 kHz. In FIG. 18C, there is only some disturbance in the shape of the envelope remaining at the spike noise position, and the effect of spike noise is almost entirely absent. From this it is concluded that the effect of spike noise on the playback signal is almost entirely a baseline shift.

Figure 19A:
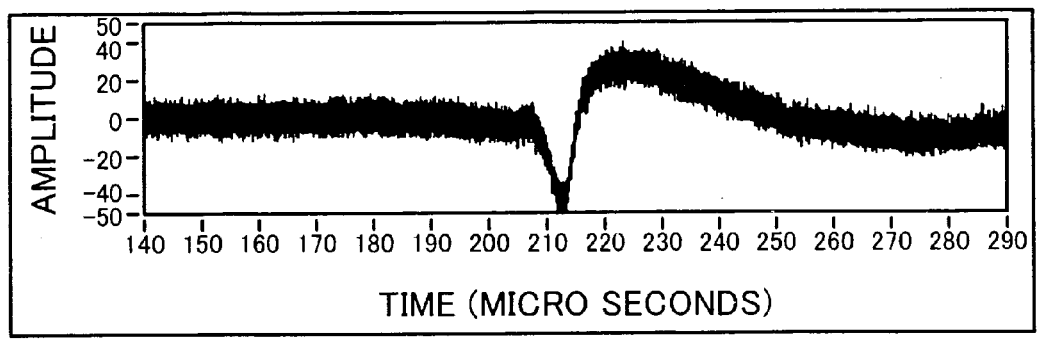
FIGS. 19A, 19B and 19C are figures showing an example of observation of amplitude modulation due to spike noise.
Figure 19B:
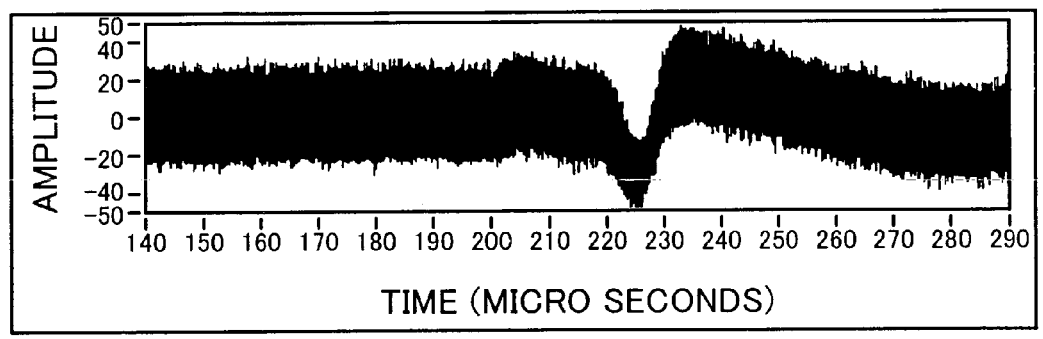
Figure 19C:
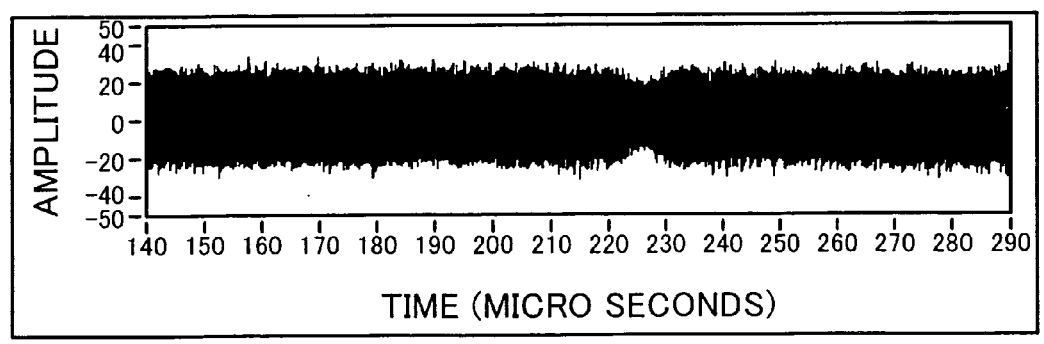

FIGS. 19A, 19B and 19C show an example of observation of a spike which accompanies amplitude modulation of the playback signal. As in FIGS. 18A, 18B and 18C, FIG. 19A is the result of observation of the DC-erased state, FIG. 19B of a playback signal after recording, and FIG. 19C of the playback signal after passing through a high-pass filter. Clearly the amplitude of the playback signal after elimination of the baseline shift by the high-pass filter is reduced at the position of spike noise.

At the place where the playback signal is reduced, in general the signal-to-noise ratio is lowered. Hence if the amount of reduction exceeds a certain amount, this may naturally be regarded as a defect. As a criterion for this judgment, for example, a decrease by 10% or more compared with the average output amplitude in an interval on the same track in which no amplitude modulation is seen may be regarded as affecting the media performance, and a decrease exceeding 30% may be regarded as a defect.

On the other hand, if the shift amount of the baseline shift is less than a certain limit, the recording area can be used without problem. This limit amount depends on the disk drive design, and in particular on the signal processing method used in the actual magnetic disk device. For criteria values currently in use, baseline shift amounts within 200% of the maximum output value (the output at low linear recording densities) can be accommodated. As one example of a method to handle baseline shifts which are within such criteria, a high-pass filter may be dynamically inserted at the stage at which a baseline shift exceeding a certain value is detected. Although insertion of the high-pass filter has some effect on the channel performance, areas in which spike noise exists can be used, so that the average recording density of the disk can be made higher than if such areas could not be used. Also, in the case of a channel in which the DC component is utilized, by handling spike noise in a manner similar to thermal asperity, areas in which spike noise exist can be employed as recording areas.

In this way, it can be seen that the effect of spike noise on playback signals should be handled differently according to the type of the effect. It is also seen that handling should be different according to the magnitude of the effect. Hence when making a pass/fail decision for a tested disk, by quantitatively evaluating the effect on the playback signal of spike noise, more accurate decisions become possible compared with decisions made simply on the basis of the number of spike noise occurrences or similar. For example, instances in which the overall actual effect of spike noise on playback signals is small, but a usable disk is rejected due to a large total number of spike noise occurrences, can be avoided. Conversely, cases in which the number of spike noise occurrences is small, but these have a large effect on the playback signal, so a disk which is in fact unusable is accepted, can also be avoided. In other words, the manufacturing yield of media and magnetic disk devices can be raised.

Thus the test program makes pass/fail decisions based not only on the number of points at which baseline shift and amplitude modulation of the playback signal due to spike noise occur, but also on the extent of the effects of each. As one index for use in making a synthetic pass/fail decision for a tested disk, the average recording density is used. That is, the average recording density is calculated from the number of defects and areas which should be treated as defects, and from the number of areas which can be used, but with reduced performance, and the extent of the reduced performance. In addition to simple pass/fail decisions, it is also possible to classify tested media into a plurality of grades, for example using the average recording density as an index.

Sixth Embodiment

A modification of the testing equipment shown in FIG. 15 is explained. The testing equipment of this embodiment has a discriminator with configuration different from that of the testing equipment explained in the fifth embodiment; otherwise the configuration is the same.

Figure 20:
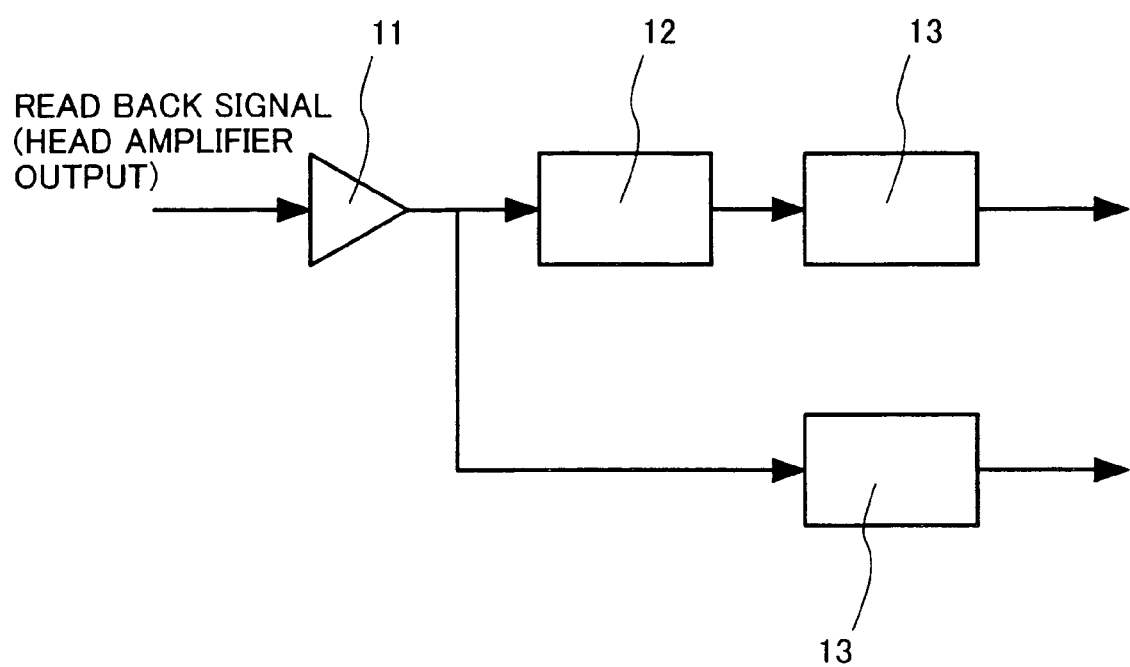
FIG. 20 is a figure showing an example of the configuration of a discrimination circuit used to discriminate baseline shift and amplitude modulation.

FIG. 20 is a figure showing an example of the configuration of a discriminator used in the testing equipment of this embodiment. In this example, there are two discriminator output channels. One of the channels is the same as in FIG. 17; the other channel is that of FIG. 17, but with the high-pass filter removed. The output of the latter simply passes through the envelope detector 13, and so the output contains a baseline shift and amplitude modulation due to spikes. Hence in this output, the baseline shift and amplitude change appear as peaks and valleys. However, the reduction in amplitude and the negative baseline shift both appear as valleys, and so the two types of effect cannot be discriminated. Hence, as explained in the fifth embodiment, amplitude modulation can be discriminated from the output on the side passing through the high-pass band filter 12, so that by comparing the two, baseline discrimination and amplitude modulation can be discriminated.

If a digital storage oscilloscope having two or more input channels is used, the output of the two channels of FIG. 20 can be captured simultaneously, so that even if this discriminator is used, no large difference in detection times occurs compared with the case in which the discriminator of FIG. 17 is used.

Figure 21:
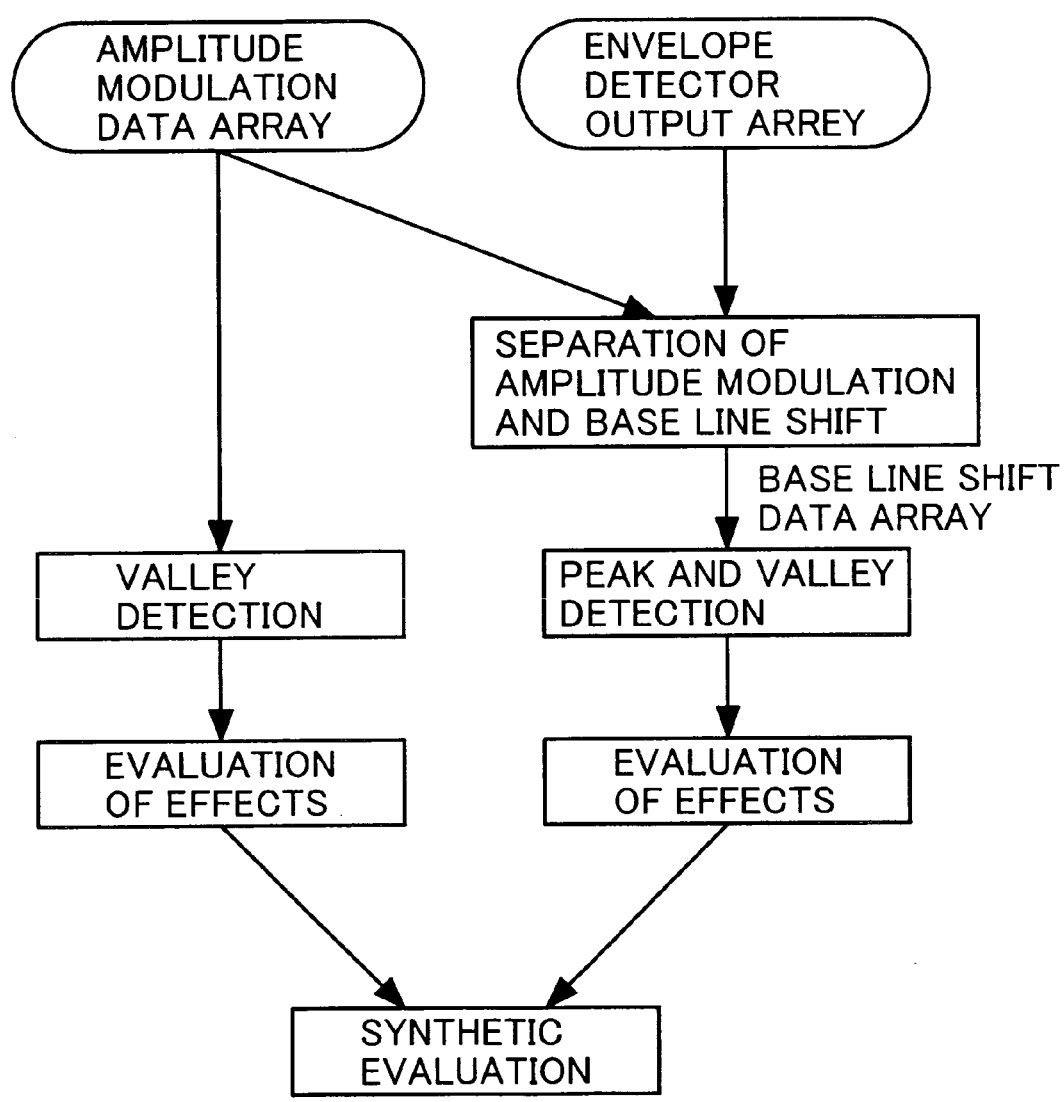
FIG. 21 is a figure explaining the procedure for judging media quality.

FIG. 21 shows the procedure in the decision stage for separately evaluating the baseline shift and amplitude modulation due to spike noise, and for using both these results in a synthetic evaluation of media performance. In this case, the acquired data is of two types: an envelope detector output series obtained by sampling the output of the envelope detector, and an amplitude modulation data series obtained by sampling the envelope detector output after passing through a high-pass filter. The latter mainly comprises information on the playback signal amplitude, but in practice also comprises components other than the playback signal amplitude, since the envelope detector is affected by media noise and other factors. Similarly, the former also comprises components other than the playback signal amplitude and baseline shift. However, the extent of the effect of media noise is the same in both, so in this case, when calculating the baseline shift, the amplitude modulation data series is simply subtracted from the envelope detector output series. In the following, this is called the baseline shift series.

Points at which amplitude modulation occur are found by calculating minima points, that is, valleys, in the playback signal amplitude for each radius from the amplitude modulation data series. Detection of valleys is performed by searching for points at which the amplitude is decreased by a fixed fraction or more from the average amplitude over a fixed interval, and at which the derivative passes through zero. By comparing the extent and number of such discovered amplitude modulation points, for example, the media grade with respect to amplitude fluctuation points can be determined.

Points at which baseline shift occurs can similarly be determined from the baseline shift series. However, the baseline shift has a polarity, and so it is necessary to determine maxima and minima. The media grade with respect to baseline shift can be determined similarly to the procedure used for amplitude modulation. Finally, a synthetic pass/fail decision can for example be made based on both the amplitude modulation and the baseline shift evaluation results.

Seventh Embodiment

Below, another modification of the testing equipment shown in FIG. 15 is explained. The testing equipment of this embodiment has a discriminator configuration different from that of the testing equipment explained in the fifth and sixth embodiments, but otherwise the configuration is the same.

Figure 22:
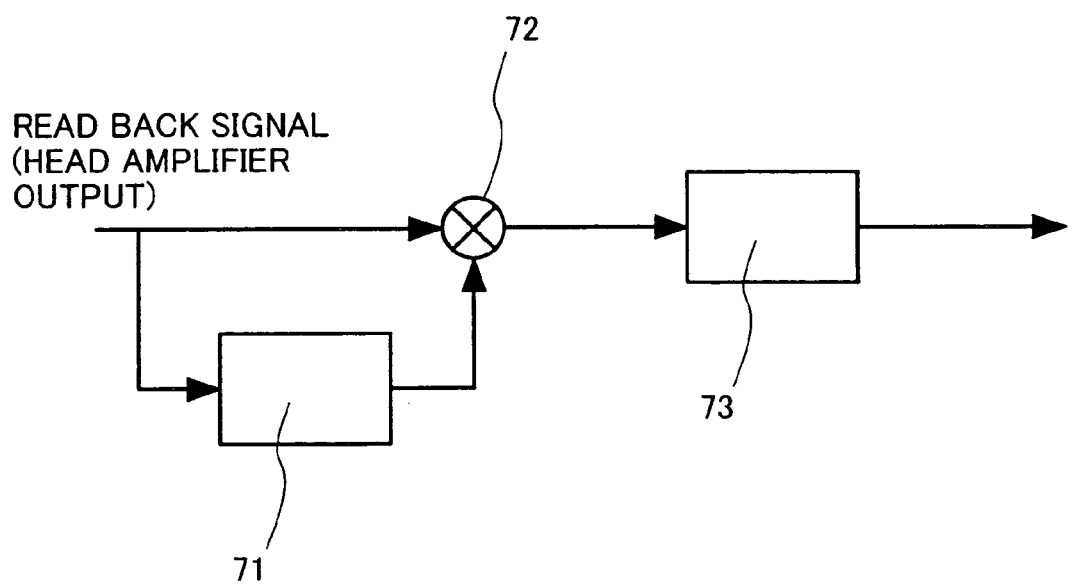
FIG. 22 is a figure showing an example of the configuration of a discrimination circuit using homodyne detection.

FIG. 22 is a figure showing an example of the configuration of a homodyne detector which is a discriminator used by the testing equipment of this embodiment. The details of the configuration and operation of homodyne detectors are explained in many references and elsewhere, and so are not discussed here (for example, see pp. 135 to 138 of *Communication Systems* by B. P. Lathi, published by McGraw-Hill Book Co., Sep. 1, 1977).

Operation is briefly explained as follows. Here as previously, a series of "1"s is recorded on the media, so that the playback signal is a cyclic signal. The carrier extraction circuit 71 generates a signal having a frequency synchronous with the playback signal. If a circuit employing a phase-locked loop is used, a signal which is almost completely synchronous with the fundamental frequency (carrier frequency) and phase of the playback signal can be obtained. By inputting this signal and the playback signal into the mixer 72, and removing unnecessary high-frequency components using a low-pass filter 73, the playback signal envelope can be obtained under nearly ideal conditions. Also, the playback signal baseline shift is also nearly completely removed from the output from this circuit. On the other hand, in a discriminator comprising an integrator circuit as in an envelope detector, the capacitor is charged by the noise voltage, so that the observed playback signal amplitude is larger than the actual amplitude. Hence this circuit is suitable for cases in which the degree of amplitude modulation of the playback signal due to spike noise is to be evaluated quantitatively.

Eighth Embodiment

Still another modification of the testing equipment shown in FIG. 15 is explained. The testing equipment of this embodiment has a discriminator configuration different from that of the testing equipment explained in the fifth, sixth and seventh embodiments, but otherwise the configuration is the same.

Figure 23:
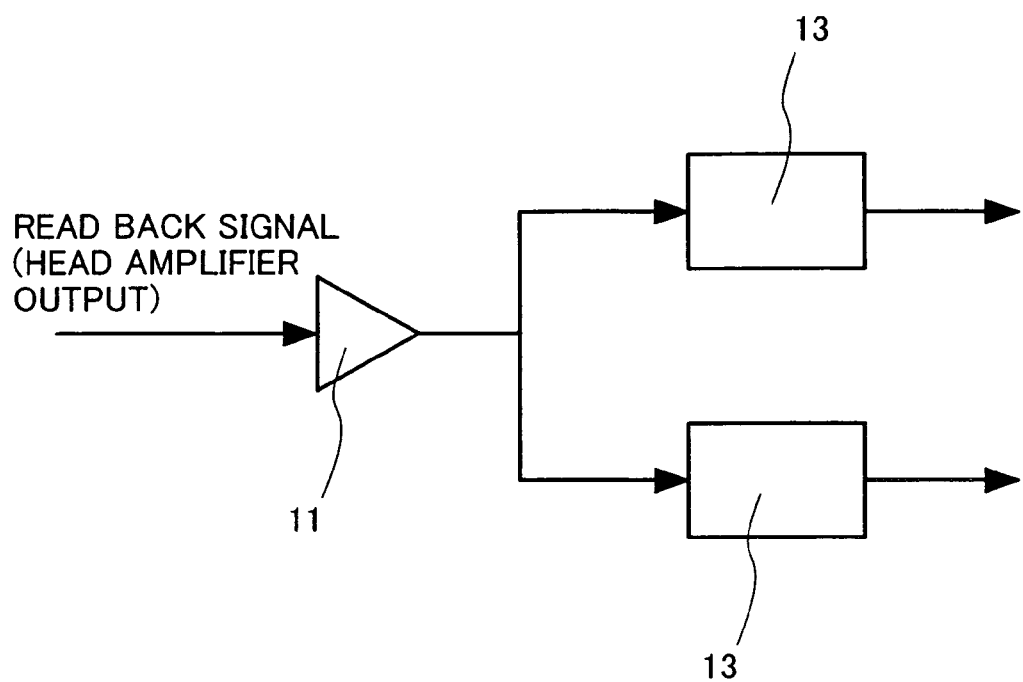
FIG. 23 is a figure showing an example of the configuration of a discriminator for simultaneous acquisition of upper and lower envelopes.

Many envelope detectors use an integrator and diode, so that envelopes can be detected separately on the positive and negative sides of the playback signal. By comparing the envelopes on the positive and the negative sides, the symmetry of the positive and negative sides of the envelope can be evaluated, and in addition, the results can be used for discrimination of the baseline shift and amplitude modulation of the playback signal. FIG. 23 is an example of the configuration of a discriminator utilizing this feature. The output of the amplifier 11 is input to the two envelope detectors 13, 13. The two envelope detectors have the same configuration, and are adjusted to the same time constant. However, one detects the envelope on the positive side of the playback signal, and the other detects the envelope on the negative side. If the envelope detector uses a diode and an integrator, it is sufficient to invert the polarity of the diode of one of the detectors. Hence by taking the sum of the outputs of the two, the baseline shift can be obtained; by taking the difference, the positions of amplitude modulation can be obtained as peaks or valleys in the output signal.

Ninth Embodiment

In the prior art, when servo signals are recorded onto double-layer perpendicular magnetic recording media in which spike noise is distributed radially, it was not possible to avoid the occurrence of traversal of servo signals and spike noise. However, if the spike noise distribution can be determined in advance, it is possible to record servo signals while avoiding spike noise.

Figure 24:
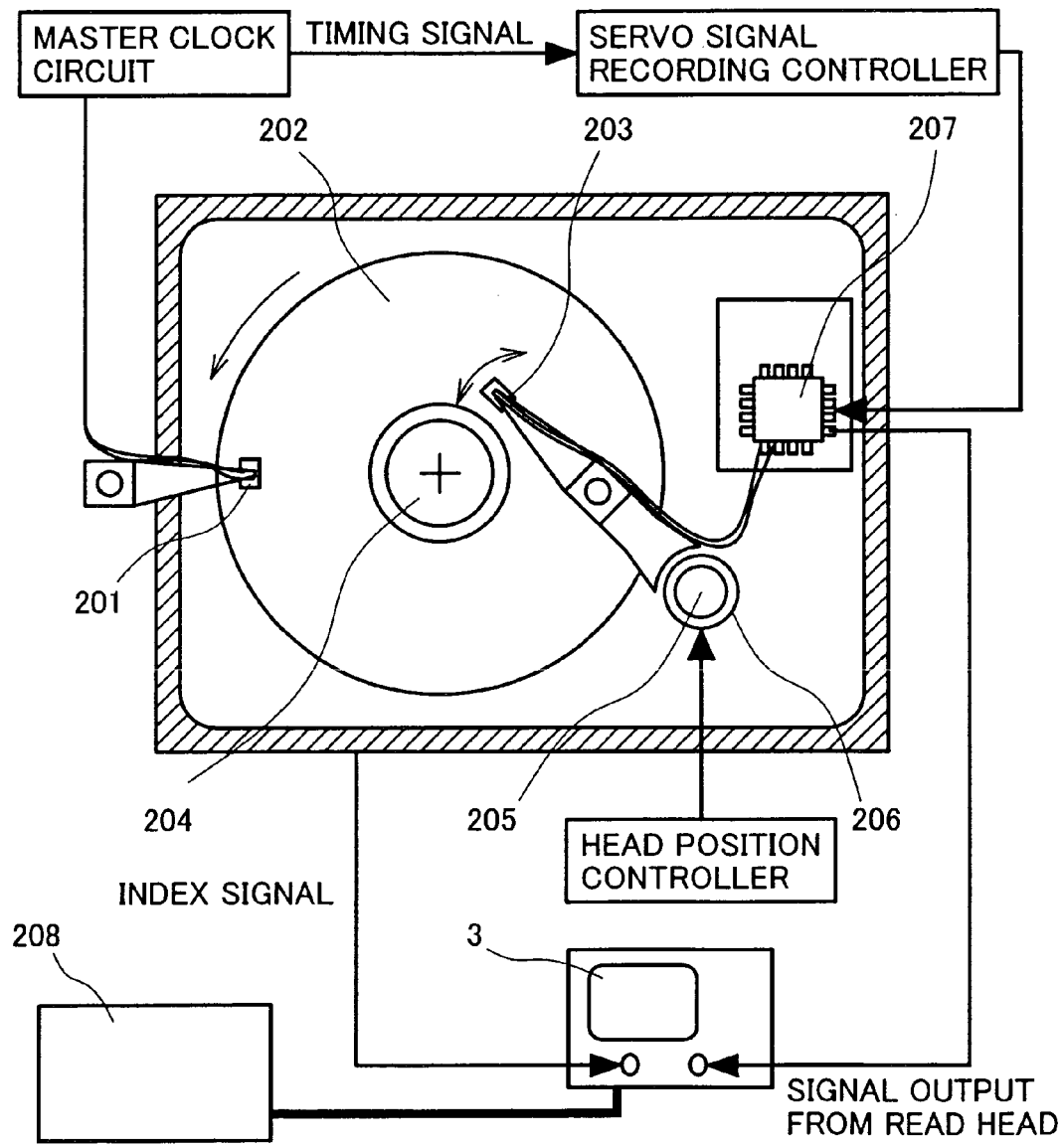
FIG. 24 is a summary figure showing an example of a servo signal recording device of this invention.

As a device for recording servo signals, FIG. 24 is a conceptual diagram of a servo track writer. For simplicity, part of the connections in the figure are omitted, but the control device 208 executes supervisory control over the entire system. That is, the servo signal recording control unit is also controlled by the control device. Prior to recording servo signals, the control device first determines the spike noise distribution using the method and procedure described in the first embodiment. The spike noise distribution thus determined is stored in memory. As opposed to a spin-stand, in a magnetic disk device prior to recording servo signals, there is no means for detecting the head position; therefore a rotary encoder 205 is added to the rotary actuator 206 to detect the head position as a rotation angle. Of the information for the head position on the media, angle coordinates are detected using the index signal of the spindle, or using a rotation synchronization pulse obtained based on a cyclic signal recorded and played back by a clock head 201. The rotary actuator 206 is rotated by the head position control unit, and the position of the magnetic head 203 is moved sequentially to record the servo signal. The recording and playback amplifier 207 obeys instructions from the control device and the servo signal recording control unit to amplify magnetic head playback element driving and playback signals in order to drive the magnetic head. When recording servo signals, the timing is always adapted to the rotation synchronization pulse obtained based on the cyclic signal recorded and played back by the clock head 201, and servo signals are recorded on the double-layer perpendicular magnetic recording media 202 by the magnetic head.

Figure 25:
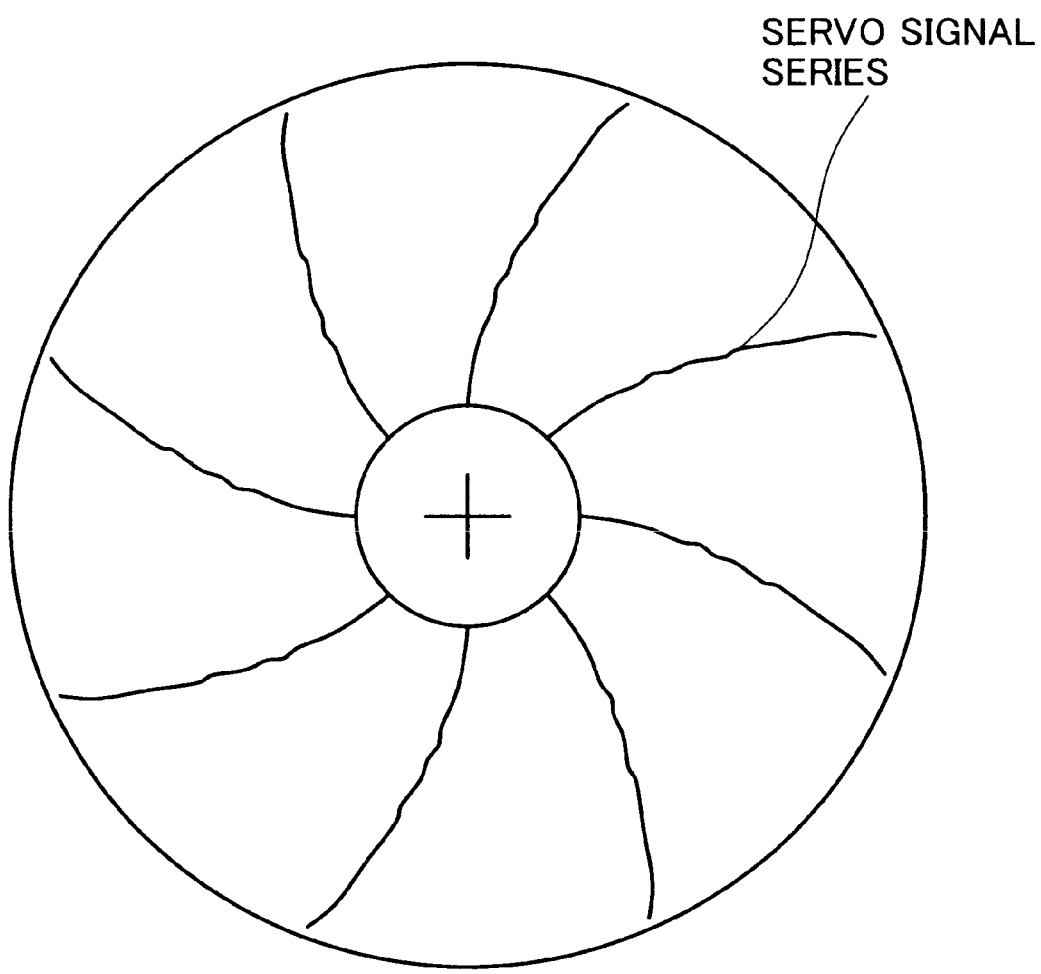
FIG. 25 is a summary figure showing an example of the arrangement of servo signals.
Figure 26:
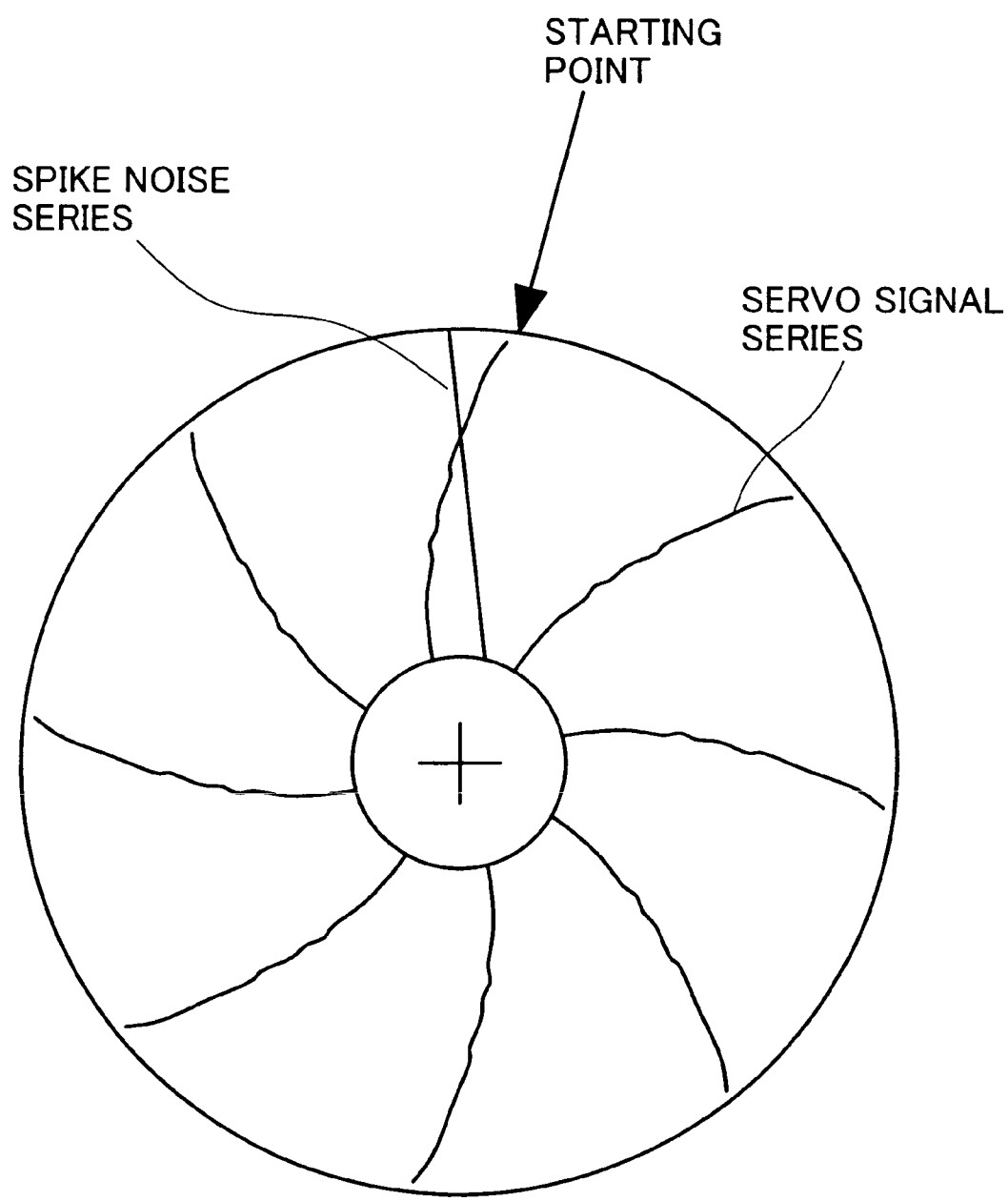
FIG. 26 is a figure showing an example of traversal of a servo signal series by a spike noise series.
Figure 27:
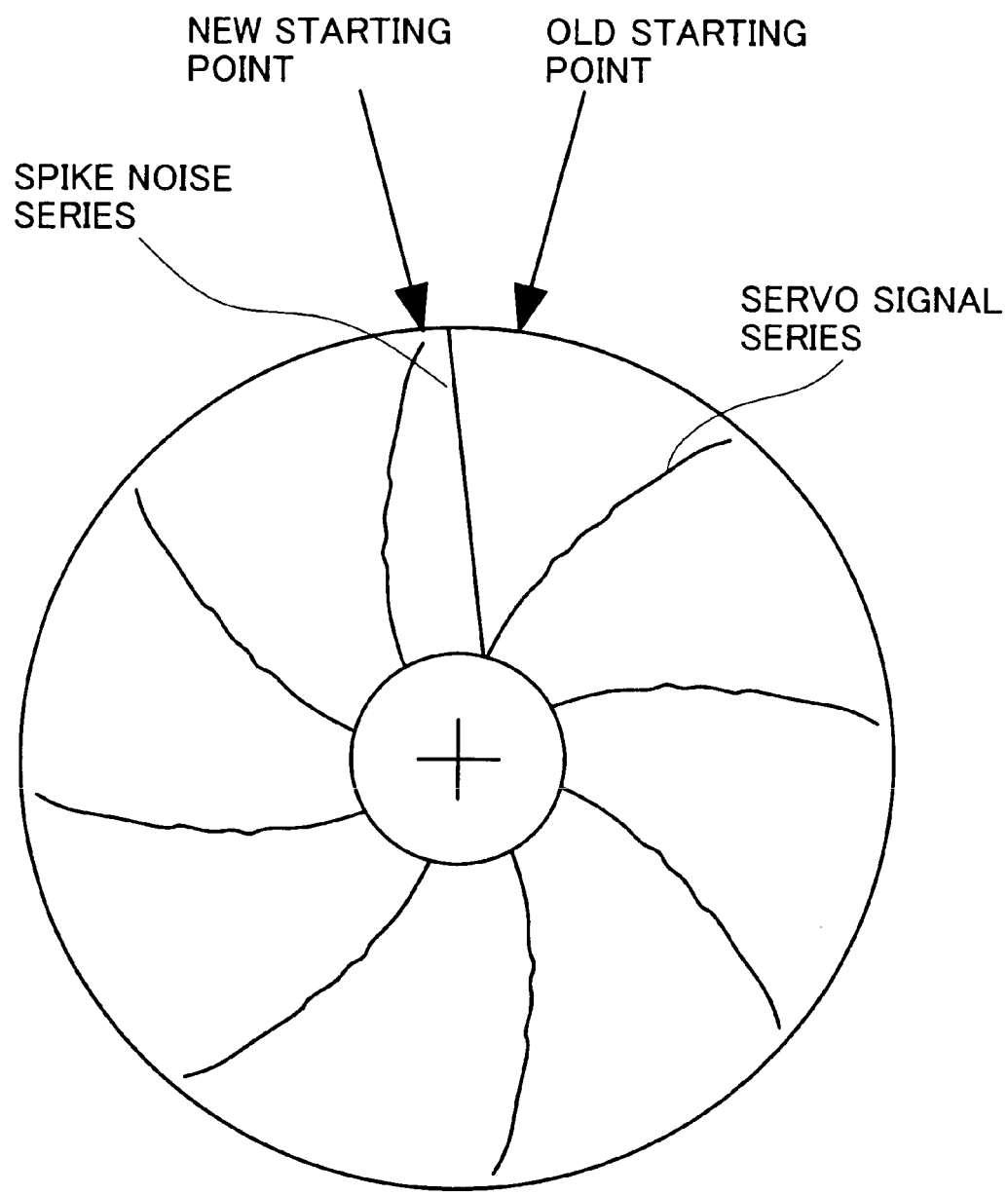
FIG. 27 is a figure showing an example of avoidance of traversal of a servo signal series by a spike noise series, by changing the phase for starting servo signal recording.

Servo signals are recorded, for example, in positions such as those shown in FIG. 25. The arrangement of the servo signal regions in arc shapes is due to the fact that a rotary actuator is used for magnetic head seeking. The servo signal areas in FIG. 25 are represented by lines, but in actuality, of course, they have a certain length in the circumferential direction. Hence when servo signals are written in such an arrangement on media in which there is spike noise, traversal of spike noise occurs with a certain probability. An example of such traversal is shown in FIG. 26. Writing of the servo signal begins from the position of the outermost circumference, shown in FIG. 26. At this time, one cause for the traversal of spike noise areas by servo signals is an unsuitable disk rotation angle (phase) when servo signal writing is begun. By modifying the phase with which writing of the servo signal is begun such that there is no traversal of the servo signal and the spike noise areas, as in FIG. 27, comparing the previously obtained spike noise distribution with the servo signal position information, traversal of the servo signal series and the spike noise series is avoided.

Figure 28:
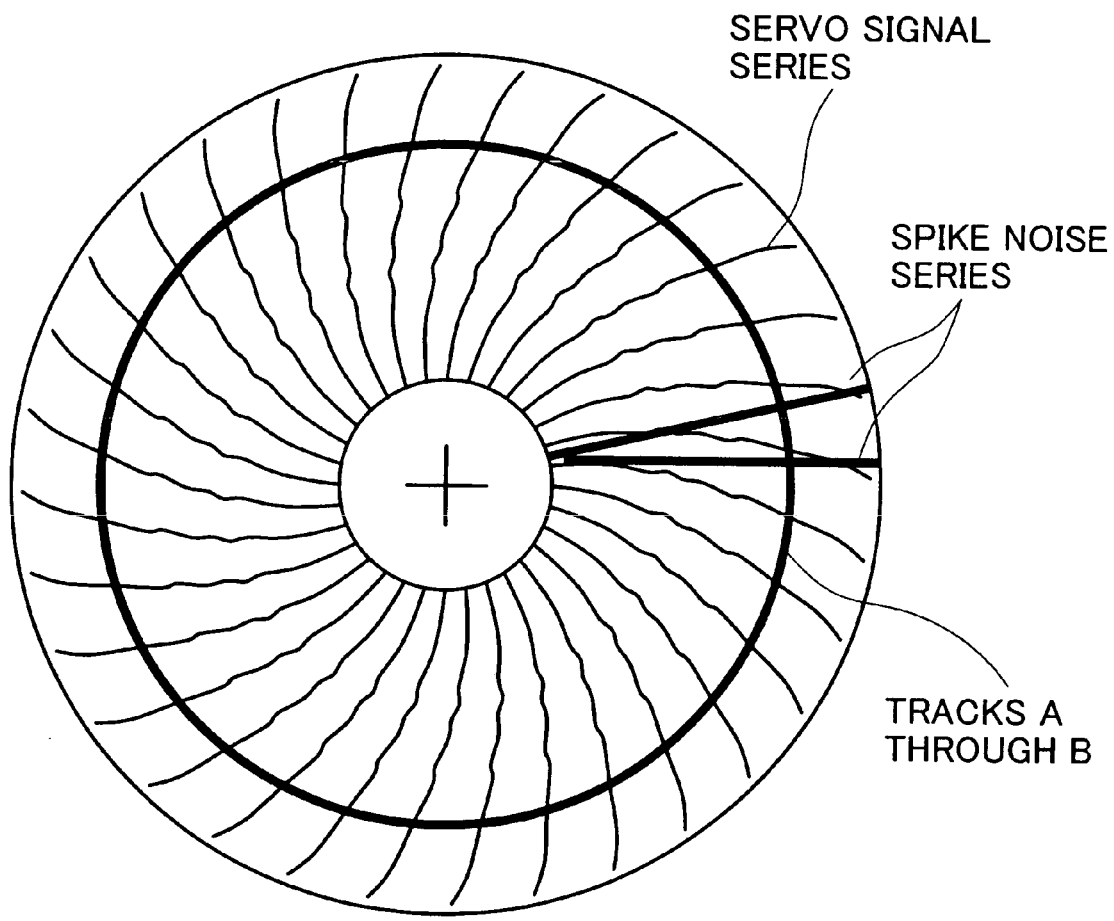
FIG. 28 is a figure showing an example of traversal, by two adjacent spike noise series, of servo signal series at two consecutive locations on the same track; and, FIG. 29 shows an example of avoidance of the traversal by spike noise series of servo signal series at two consecutive locations on the same track, by changing the phase for starting servo signal recording.

Another method of preventing traversal of servo signal and spike noise areas involves changing the servo signal arrangement such that there is no traversal, based on the spike noise distribution obtained in advance. However, the servo signal must span neighboring tracks, so that it is difficult for the position to be modified significantly from one track to another. Upon recording normally as shown in FIG. 28, by shifting the writing phase of a servo signal series which traverses a spike noise area, the spike noise is avoided. In this method, there occur regions in which the phase difference between servo signal series is larger than normal. Hence the amount of change in the write phase of the servo signal series must of course be within the range in which reductions in tracking precision in the region can be held within the allowable range.

Through the above method, servo signals can be recorded while avoiding spike noise. However, there are cases in which neither of the two specific examples described above is alone sufficient. Hence as a more practical method, the two above procedures may be combined. That is, first a write starting phase with the lowest probability of traversal for an ordinary servo signal arrangement is selected, and then the write starting phase for each servo signal series is adjusted.

Figure 29:
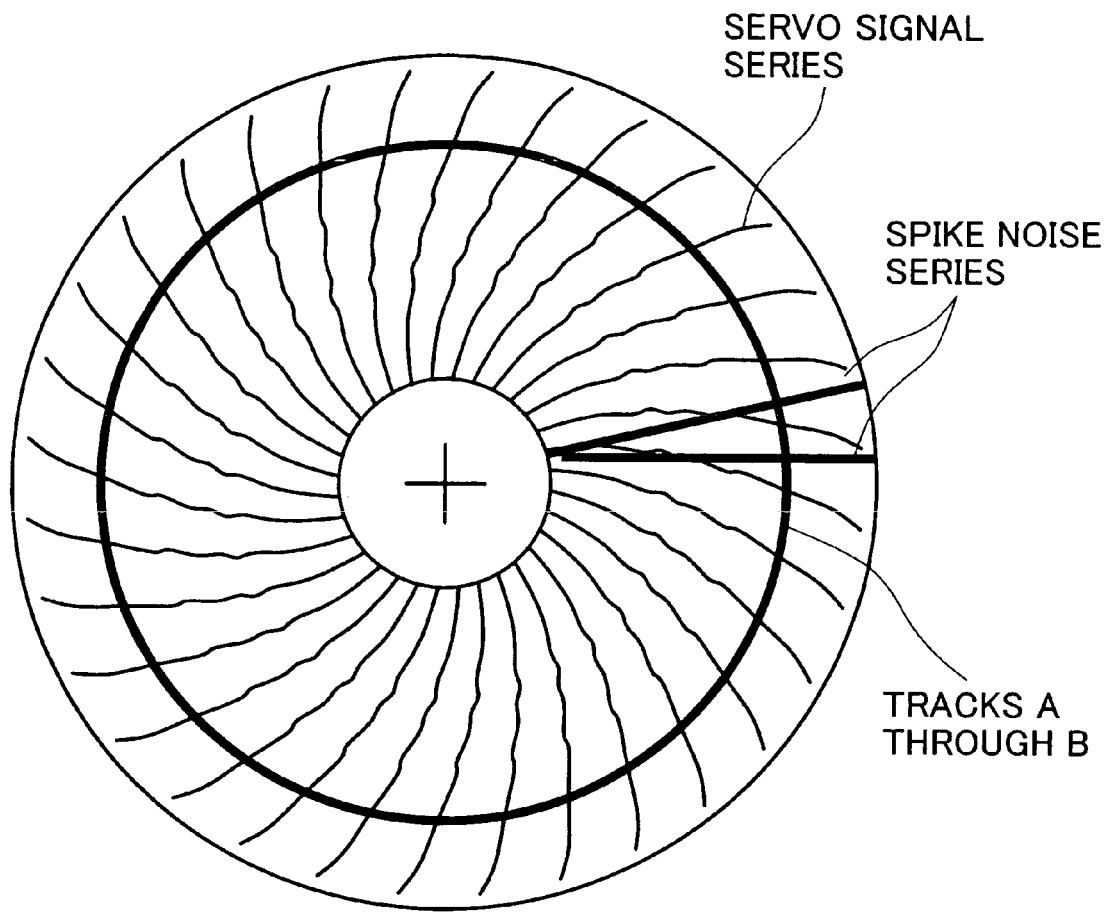

Depending on the number of spike noise areas and their distribution, or on the number of servo signals per circumference, it may not be possible to avoid traversal of servo signals by spike noise areas, as in the example shown in FIG. 28. In the example of FIG. 28, there are a large number of servo signals per circumference, so that when there exists a radially-continuous spike noise series, traversal of one of the servo signal series is virtually certain. Also, in this example the interval between two adjacent radially-shaped spike noise series and the interval between servo signal series are essentially the same in a given radius range (from track A to track B). Both the spike noise series and the servo noise series have a certain width, so that the phenomenon of traversal occurs with considerable probability. In such cases, depending on the phase at which servo signal writing is begun, servo signals may be traversed by spike noise areas at two consecutive places in the circumferential direction, as in the example of FIG. 28. In such cases, a normal servo signal cannot be obtained at two consecutive places, giving rise to the problem of reduced tracking precision. By adjusting the phase of the beginning of writing, or the phase of writing for a specific servo signal series, such that spike noise areas do not traverse servo signals at two consecutive places on the same track, the effect of spike noise can be minimized. FIG. 29 is an example in which traversal of servo signals by spike noise areas at two consecutive places on the same track on the media of FIG. 28 is avoided by shifting the phase at which writing of servo signals is begun.

In this embodiment, the index pulse of the spindle 204 is used as the disk rotation origin. When using a motor which does not output an index pulse, a clock signal can be recorded using the clock head 201, and the playback pulses counted to create an origin signal; or, a laser probe can be used to determine the origin signal from the texture of the spindle-side surface.

According to another aspect of the present invention, the following perpendicular magnetic recording media testing device and the servo signal recording method are realized.

(1) A perpendicular magnetic recording media testing device, comprising:
  means for supporting and driving in rotation perpendicular magnetic recording media;
  means for playing back signals arising from the magnetization state of said perpendicular magnetic recording media; and,
  means for detecting amplitude modulation components from signals played back by the means for signal playback.

(2) A perpendicular magnetic recording media testing device, comprising:
  means for supporting and driving in rotation perpendicular magnetic recording media;
  means for playing back signals arising from the magnetization state of said perpendicular magnetic recording media; and,
  means for detecting the baseline shift of signals played back by the means for signal playback.

(3) The perpendicular magnetic recording media testing device according to (1), wherein said means for detection of amplitude modulation components comprises a high-pass filter and envelope detector, or a homodyne detector.

(4) A servo signal recording method, for recording servo signals on perpendicular magnetic recording media, comprising:
  a step in which the spike noise distribution in the perpendicular magnetic recording media is determined, and is stored in memory;
  a step in which said stored spike noise distribution is compared with servo signal arrangement information, and the starting phase for writing of the servo signal which has the lowest probability of traversal by spike noise areas for a normal servo signal arrangement is selected; and,
  a step in which the phase for writing each servo signal series is adjusted such that spike noise areas do not traverse two consecutive servo signals on the same track.

Whereas in the prior art the position of spike noise was observed only at a given radius position, or was rendered visible in two dimensions to obtain only qualitative results, by means of this invention quantitative evaluations can be performed, and pass/fail judgments in manufacturing processes as well as automatic data processing in research and development are made possible. Also, it is possible to greatly reduce the memory and the storage device capacity necessary to store the results of evaluations of spike noise.

In addition to information concerning the position and number of occurrences and the amplitude of spike noise, it is also possible to quantitatively evaluate the effects of spike noise when signals are actually recorded. Through this, more accurate pass/fail decisions and classification are made possible, so that as a result manufacturing yields of double-layer perpendicular magnetic recording media and of magnetic disk devices can be improved. Moreover, servo signals can be recorded so as to avoid traversal by spike noise areas.

What is claimed is:

1. A perpendicular magnetic recording media testing method, comprising:
  a step in which a magnetic head is loaded at a prescribed radial position on perpendicular magnetic recording media comprising a soft magnetic underlayer, and signals are recorded at a prescribed frequency;
  a step in which said recorded signals are played back; and
  a step in which the type of effect on the playback signals of spike noise appearing in said playback signals is discriminated by means of the envelope shape of said playback signals.

2. The perpendicular magnetic recording media testing method according to claim 1, wherein the amplitude modulation component contained in the playback signal waveform and corresponding to said spike noise is discriminated.

3. The perpendicular magnetic recording media testing method according to claim 1, wherein the baseline shift of said playback signal is discriminated.

4. The perpendicular magnetic recording media testing method according to claim 2, wherein said amplitude modulation is discriminated by means of a high-pass filter and envelope detector.

5. The perpendicular magnetic recording media testing method according to claim 2, wherein said amplitude modulation is discriminated by a homodyne detector.

6. The perpendicular magnetic recording media testing method according to claim 1, further comprising a step in which the amplitude modulation component is determined from the envelope shape of said playback signal; a step in which said amplitude modulation component is eliminated from said playback signal; and a step in which the baseline shift is determined from the playback signal with said amplitude modulation component removed.

* * * * *